United States Patent
Ström et al.

(10) Patent No.: US 7,848,597 B2
(45) Date of Patent: Dec. 7, 2010

(54) DATA PROCESSING

(75) Inventors: Jacob Ström, Stockholm (SE); Joel Askelöf, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1094 days.

(21) Appl. No.: 11/517,563

(22) Filed: Sep. 8, 2006

(65) Prior Publication Data

US 2008/0063303 A1    Mar. 13, 2008

(51) Int. Cl.
    *G06K 9/32* (2006.01)
(52) U.S. Cl. ............... 382/298; 345/472; 345/660; 348/581; 358/1.2
(58) Field of Classification Search ........... 382/298; 345/472, 660; 348/581; 358/1.2; 708/208
    See application file for complete search history.

(56) References Cited

U.S. PATENT DOCUMENTS 6,157,376 A * 12/2000 Eglit ............... 345/213
7,277,101 B2 * 10/2007 Zeng ............... 345/600

OTHER PUBLICATIONS

Mitchell et al., *Reconstruction Filters in Computer Graphics*, Computer Graphics, vol. 22, No. 4, Aug. 1988, pp. 221-228.

* cited by examiner

*Primary Examiner*—Matthew C Bella
*Assistant Examiner*—Dennis Rosario
(74) *Attorney, Agent, or Firm*—Nixon & Vanderhye P.C.

(57) ABSTRACT

In an image scaling method, an image (10) having an original row/column resolution $N_O$ is scaled into a scaled image (30) having a target row/column resolution $N_T$. A filter set comprising α filters is provided, where α being equal to a quotient of the target resolution $N_T$ and a common denominator k of the original resolution $N_O$ and the target resolution $N_T$. The common denominator k is a positive number larger than one. For at least one row/column (16/18) of image elements (12), a filtered image element (32) of the scaled image (30) is formed, for each filter in the filter set, by filtering at least one image element (12) of the at least one row/column (16/18) using the filter. This image element formation is repeated up to k times over the at least row/column (16/18) to form a scaled row/column (36/38) of image elements (32) of the scaled image (30).

27 Claims, 10 Drawing Sheets

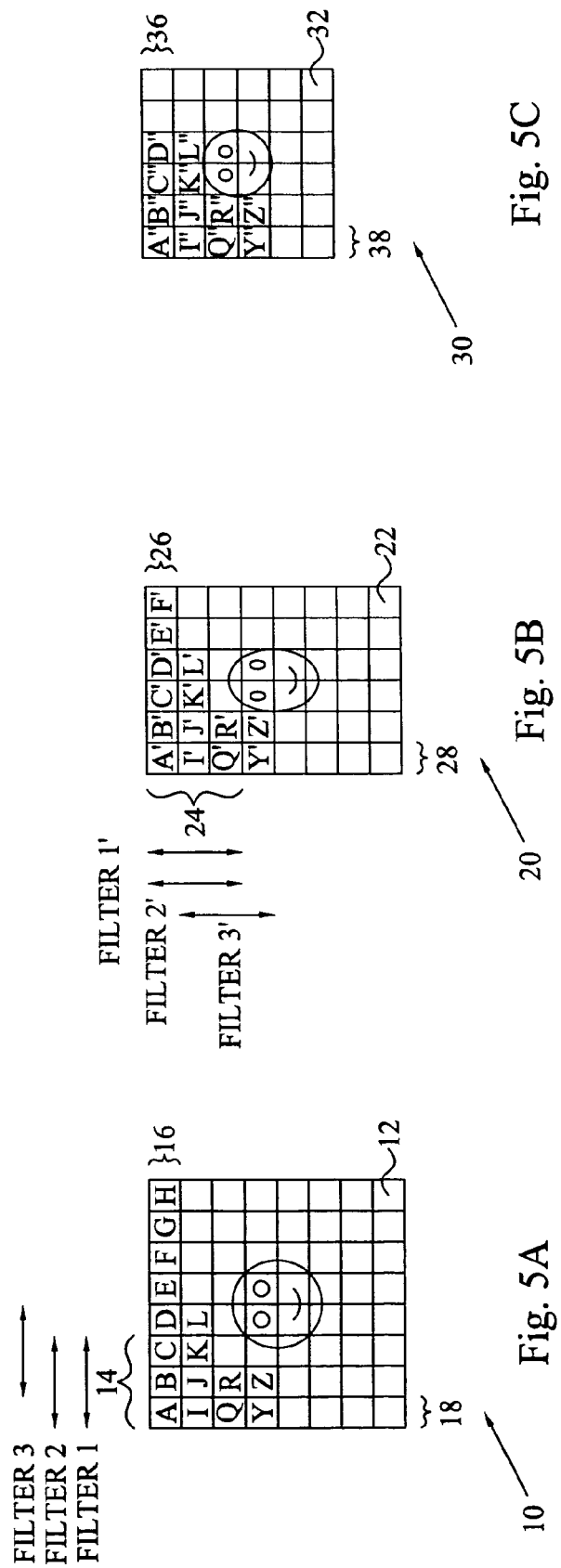

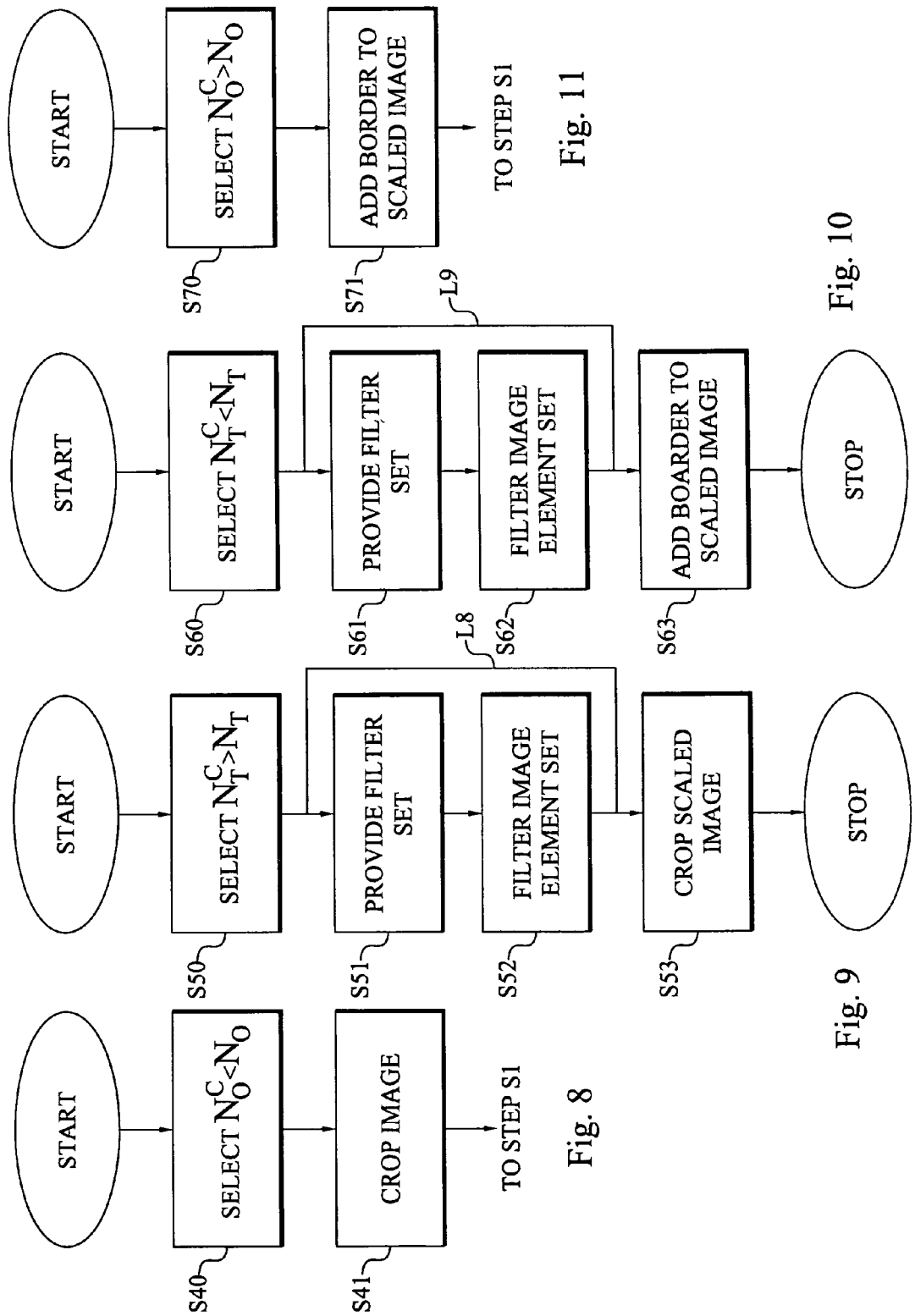

DATA PROCESSING

TECHNICAL FIELD

The technical field generally relates to data processing, and in particular to computationally efficient data signal resampling and image scaling methods and devices.

BACKGROUND

Electronic image management and display has increased tremendously the last decades, and today it is possible to view digital photographs, films, TV shows and other multimedia video and image sources on vastly different media rendering machines and equipment. Traditionally such machines have been computers, but portable and handheld devices, such as laptops, Personal Digital Assistances (PDAs), dedicated media players and mobile telephones, may today be used for viewing images and video. These image managing and rendering devices differ widely in their image processing and displaying capabilities. For example, the display screens available for the different image rendering devices may range from relatively small screen sizes in some mobile telephones, to medium sized screens in PDAs and certain mobile telephone models to the relatively large screens found with computers and laptops.

Due to these different capabilities, image scaling has become a basic and ever more vital part of the multimedia capabilities of the rendering terminal, in particular mobile terminals. Image scaling is, for example, often performed when trying to watch a JPEG (Joint Photographic Experts Group) image that is larger than the screen (in terms of pixels or image elements), or when displaying a video sequence having a format that is too big or too small for the screen.

Even though the resolution of the screens on mobile terminals and telephones is rising quickly, the camera resolutions of these terminals are rising at least as fast. In addition, other camera equipped devices, such as digital cameras, have camera resolutions of much higher resolution levels. This means that there is a need for downscaling (minification) of images and this need will increase further within a foreseeable future. Since the size used in video telephony is more dependent on bandwidth requirements than of screen resolution, it is reasonable to think that it may increase slower than screen resolutions. Thus, in the near future if one wants full screen video telephony, efficient upscaling (magnification) algorithms will be required.

Today different algorithms for image scaling exist, with nearest neighbor being among the simpler ones. The nearest neighbor technique is used, for instance, in the LG U8110 mobile telephones. These simpler scaling techniques are, however, marred by low image quality and the insertion of image artifacts. For example, the nearest neighbor scaling in the above-mentioned mobile telephone gives rise to clearly visible pixilation and anti-aliasing artifacts.

Scaling images in a more correct or less error prone manner becomes more expensive and demanding in terms of scaling time, memory requirements and power consumption, all of which are sparse in thin clients such as mobile telephones.

A reasonable trade-off between quality and complexity for image downscaling is reached by performing by a pre-filtering, for instance box filtering, repeatedly to halve the image resolution until it is less than two times larger than the target resolution. Then bilinear interpolation can be performed to downscale the image to exactly the target resolution. For example, if the original image size is 1024×768 pixels and the target size is 176×144 pixels, prefiltering averages the image in the steps 512×384 and 256×192. After that, bilinear filtering can be performed to go from 256×192 to 176×144.

However, the image quality when performing box filtering and bilinear interpolation is not free of artifacts. Depending on how much the last bilinear filtering step minimizes (downscales) the image, the resulting image may become blurry (if close to the prefiltered image resolution) or show aliasing artifacts (if far from the prefiltered image resolution).

Mathematically, the ideal way of magnifying or minifying an image is to reconstruct it using a sinc function. If the original image signal is band limited, magnification with a sinc function can reconstruct the original signal perfectly. Thus, in order to create a "perfect" image scaling algorithm, it would suffice to filter the image using sinc filters. However, there are two major problems with this approach. Firstly, sinc filters are very long as their tails die off proportionally to 1/x. This means that the filters used have to be very long and include many filter coefficients, which gives an inefficient and computationally expensive implementation. Secondly, even if such long filters would be calculated, the end result would not look very nice at all. This is due to the fact that image signals are not really band limited. For instance, a sinc filter will interpret a sharp edge as really being a ringing pattern ondulating before and after the edge, since this is the only magnified band limited signal that fits the data. This simply does not look good and for this reason sinc filters are generally not used in the art of scaling of images.

Mitchell and Netravali [1] show a bicubic filter resulting in visually more attractive scaled images than since filters. Their bicubic filters are also less computationally expensive to implement as compared to sinc functions. However, even if less complex than traditional sinc filtering, the bicubic filter is still complicated and complex enough to be a problem to calculate, especially for thin clients having limited image processing and storing capabilities and limited power supply.

There is thus a need for an image scaling algorithms that is less computationally expensive than the prior art high quality techniques but still provides adequate image quality.

SUMMARY

It is a general object to provide a computationally efficient data signal resampling and image scaling.

Briefly, the technology in this application involves, in a particular aspect, image scaling wherein an image having an original resolution $N_O$ in a first dimension (row or column) is scaled into a scaled image having a corresponding target resolution $N_T$ in the first dimension. The image scaling involves providing a filter set comprising α filters. This number α is equal to a quotient of the target resolution $N_T$ and a common denominator k of the original resolution $N_O$ and the target resolution $N_T$. In addition, the common denominator k is a positive number larger than one. Having such a relation between the original $N_O$ and target $N_T$ allows for a cyclic reuse of filters when processing and filtering rows and/or columns of the image. Thus, a given filter of the provided filter set will be used at least twice when filtering image elements of a row or column and therefore the number of different filters that have to be determined will be vastly decreased.

Therefore, when processing at least one one-dimensional array of image elements in the image, i.e. at least one row or column, a filtered image element of said scaled image is formed, for each filter in said filter set, by filtering a set of at least one image element in the at least one one-dimensional array using the filter. This image element formation is then repeated up to k times over the at least one one-dimensional array to form a scaled one-dimensional array of image elements of the scaled image.

In an illustrative example, an image having an original resolution or size of $M_O \times N_O$ image elements is scaled into a scaled image having a resolution of $M_T \times N_T$. This would require, according to the prior art solutions, calculating $N_T \times (M_O + M_T)$ filters. Assuming that $M_O=200$, $N_O=300$, $M_T=150$, $N_T=225$ then 78 750 filters would be calculated for scaling the image when applying the prior art teachings.

In contrast, the cyclic reuse of filters merely employs $\alpha$ different filters per row and $\beta$ different filters per column, where $$\alpha = \frac{N_T}{k}, \beta = \frac{M_T}{l},$$

k is a common denominator of $N_O$ and $N_T$ and l is a common denominator of $M_O$ and $M$. This means that 3 different filters will be employed per row, in this illustrative example, and each filter will be employed 50 times along a row. Correspondingly, 3 different filters will be employed per column and will be used 75 times along a row. In addition, the same 3 filters can be used for all rows and the same 3 filters can likewise be used for all columns. Thus, in a preferred implementation merely $\alpha+\beta=6$ filters need to be calculated in this illustrative example, which constitutes less than 0.1 per thousand of the prior art filter calculations.

The technology in this application therefore radically reduces the number of filters that have to be computed when scaling an image, which leads to reduced computationally effort and complexity.

These teachings can also be employed for efficient filtering or resampling of a data signal, such as an audio data signal, an image data signal (as disclosed above), etc. A data signal having an original sampling rate $N_O$ and is resampled to form a resampled data signal having a target sampling rate $N_T$. The data signal resampling involves providing a filter set comprising $\alpha$ filters. This number a is equal to a quotient of the target sampling rate $N_T$ and a common denominator k of the original sampling rate $N_O$ and the target sampling rate $N_T$. In addition, the common denominator k is a positive number larger than one. Thereafter, a filtered sample of the resampled data signal is formed for each filter in the filter set and by filtering a set of at least one sample in the data signal using the filter. The sample formation and sample set filtering is repeated up to k times, preferably k times, over the data signal to form the resampled data signal.

Other advantages will be appreciated upon reading of the below Description.

SHORT DESCRIPTION OF THE DRAWINGS

Figure 1:
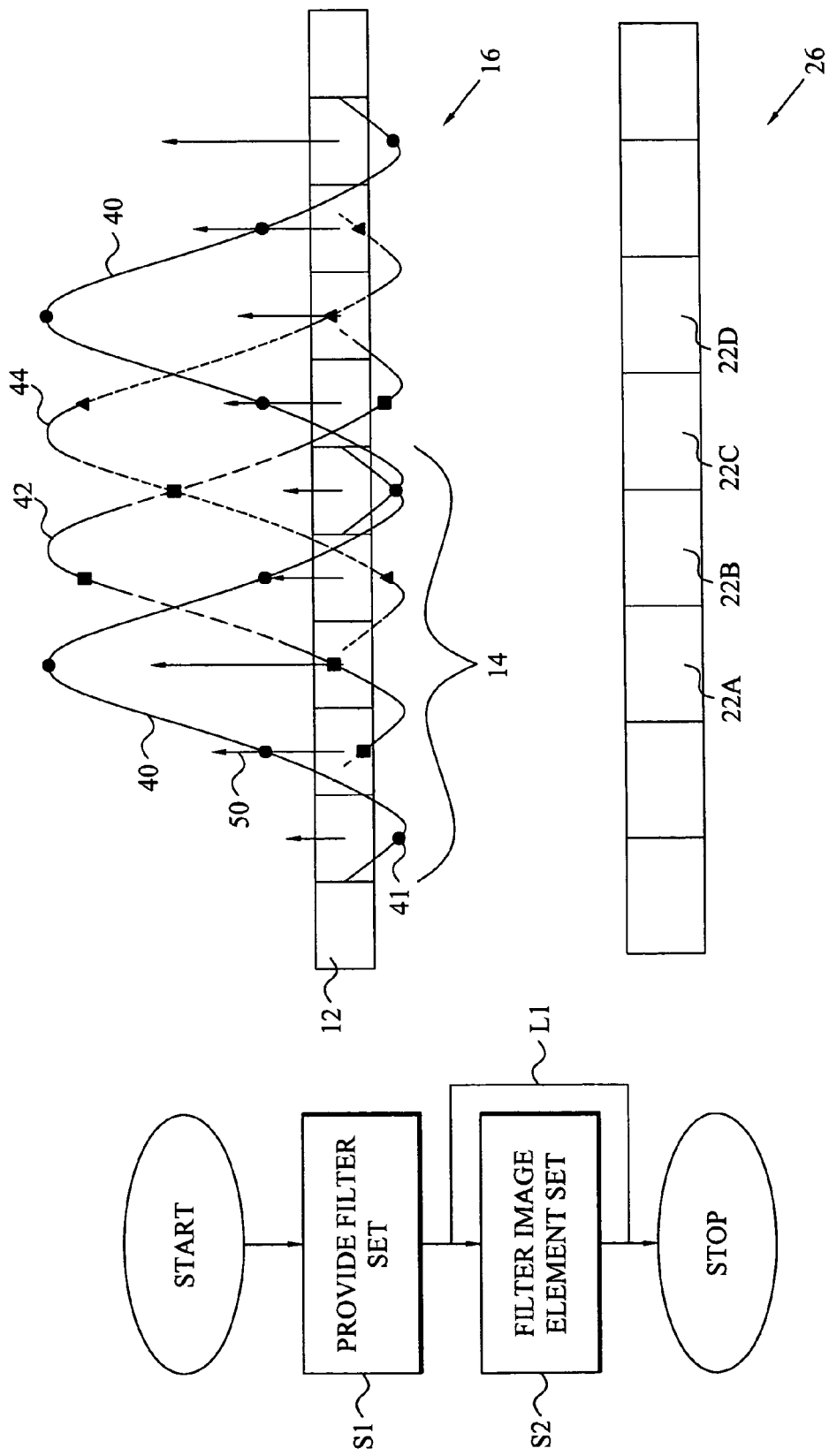
FIG. 1 is a flow diagram illustrating an image scaling method.
Figure 7A:
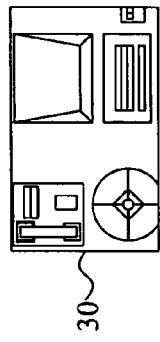
Figure 7B:
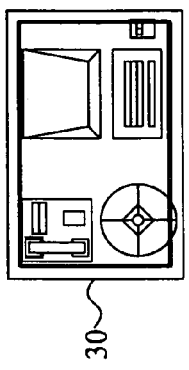
Figure 7C:
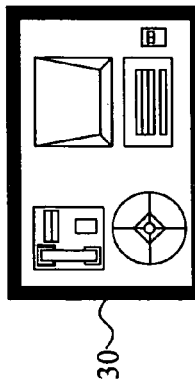
Figure 7D:
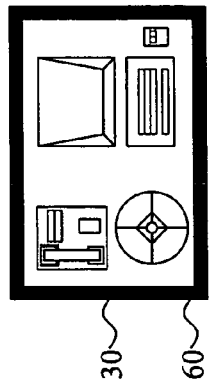
Figure 12:
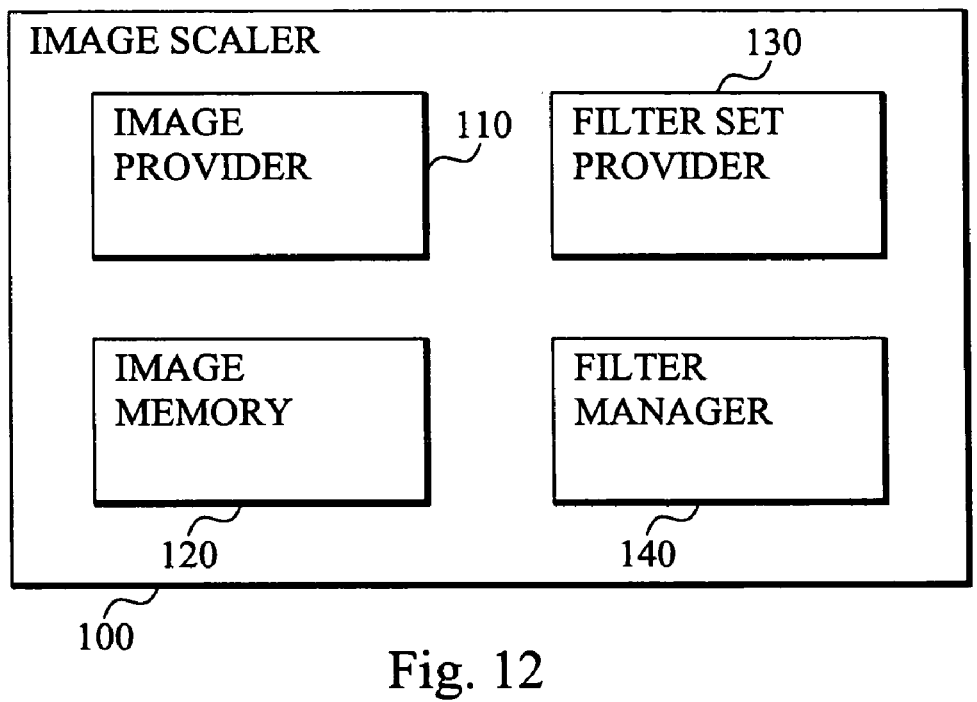
Figure 13:
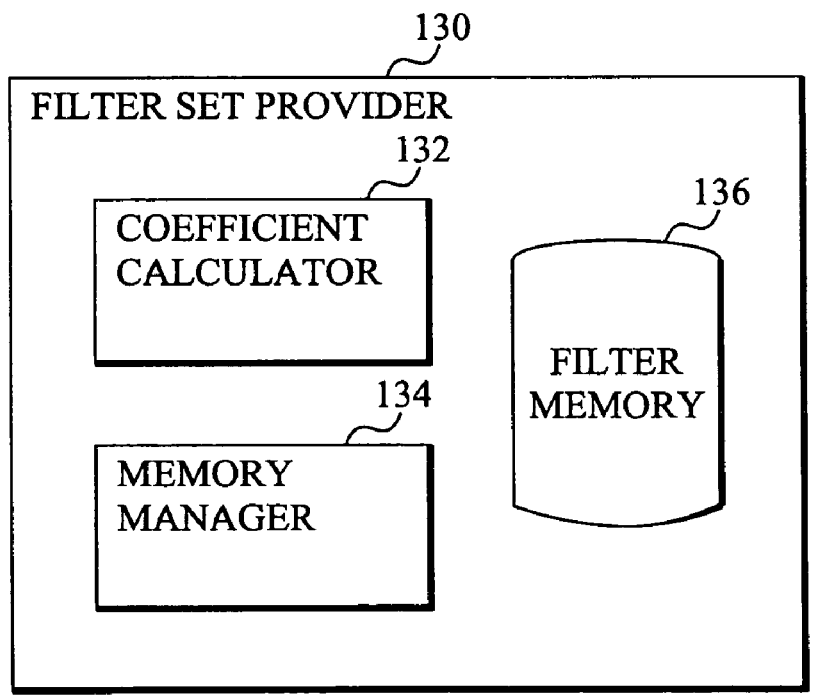
Figure 14:
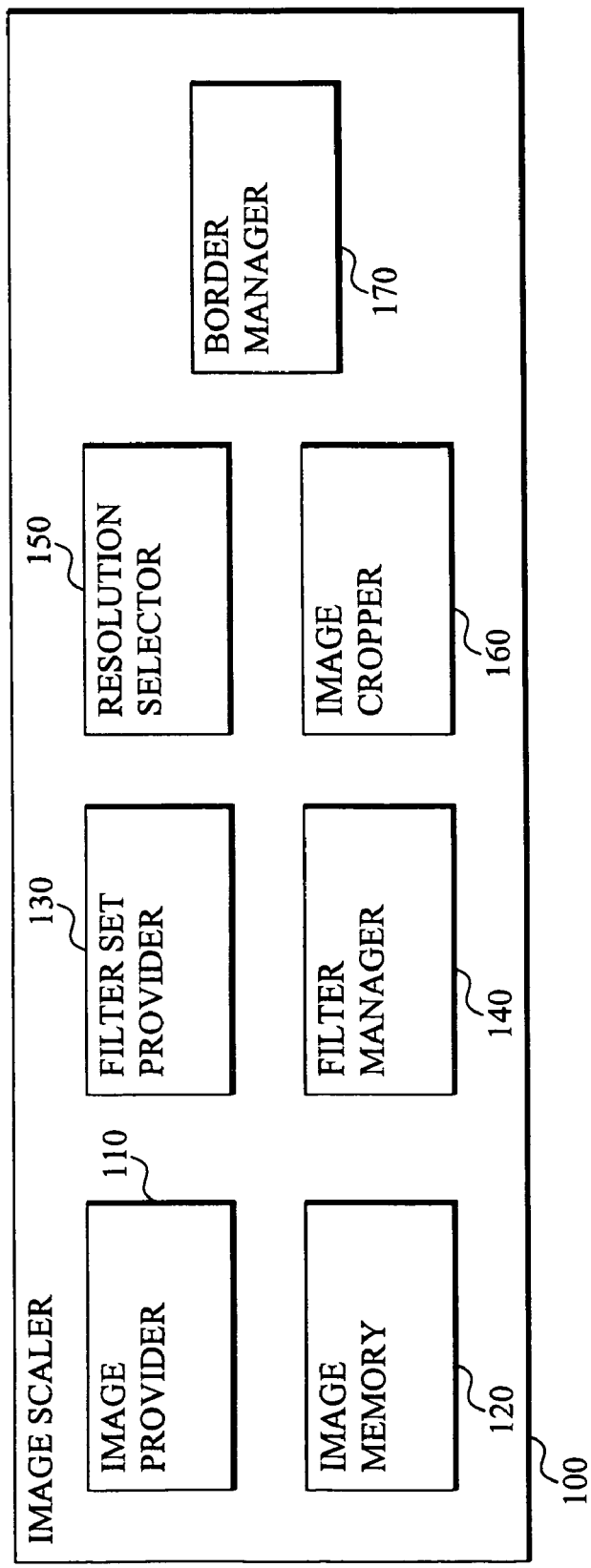

FIGS. 5A to 5C schematically illustrate downscaling of an image (FIG. 5A) to a downscaled image (FIG. 5C) via a partly scaled image (FIG. 5B);

FIG. 6 is a diagram schematically illustrating the periodic and cyclic usage of filters;

FIG. 7A schematically illustrates downscaling of an image through image cropping;

FIG. 7B schematically illustrates downscaling of an image through image cropping;

FIG. 7C schematically illustrates downscaling of an image through image boarder addition;

FIG. 7D schematically illustrates downscaling of an image through image boarder addition;

FIG. 8 is a flow diagram illustrating additional steps of the image scaling method of FIG. 1;

FIG. 9 is a flow diagram illustrating an image scaling embodiment employing image cropping;

FIG. 10 is a flow diagram illustrating an image scaling embodiment employing image boarder addition;

FIG. 11 is a flow diagram illustrating additional steps of the image scaling method of FIG. 1;

FIG. 12 is a schematic block diagram of an image scaler;

FIG. 13 is a schematic block diagram of an example embodiment of the filter set provider of the image scaler in FIG. 12;

FIG. 14 is a schematic block diagram of an image scaler; and

Figure 15:
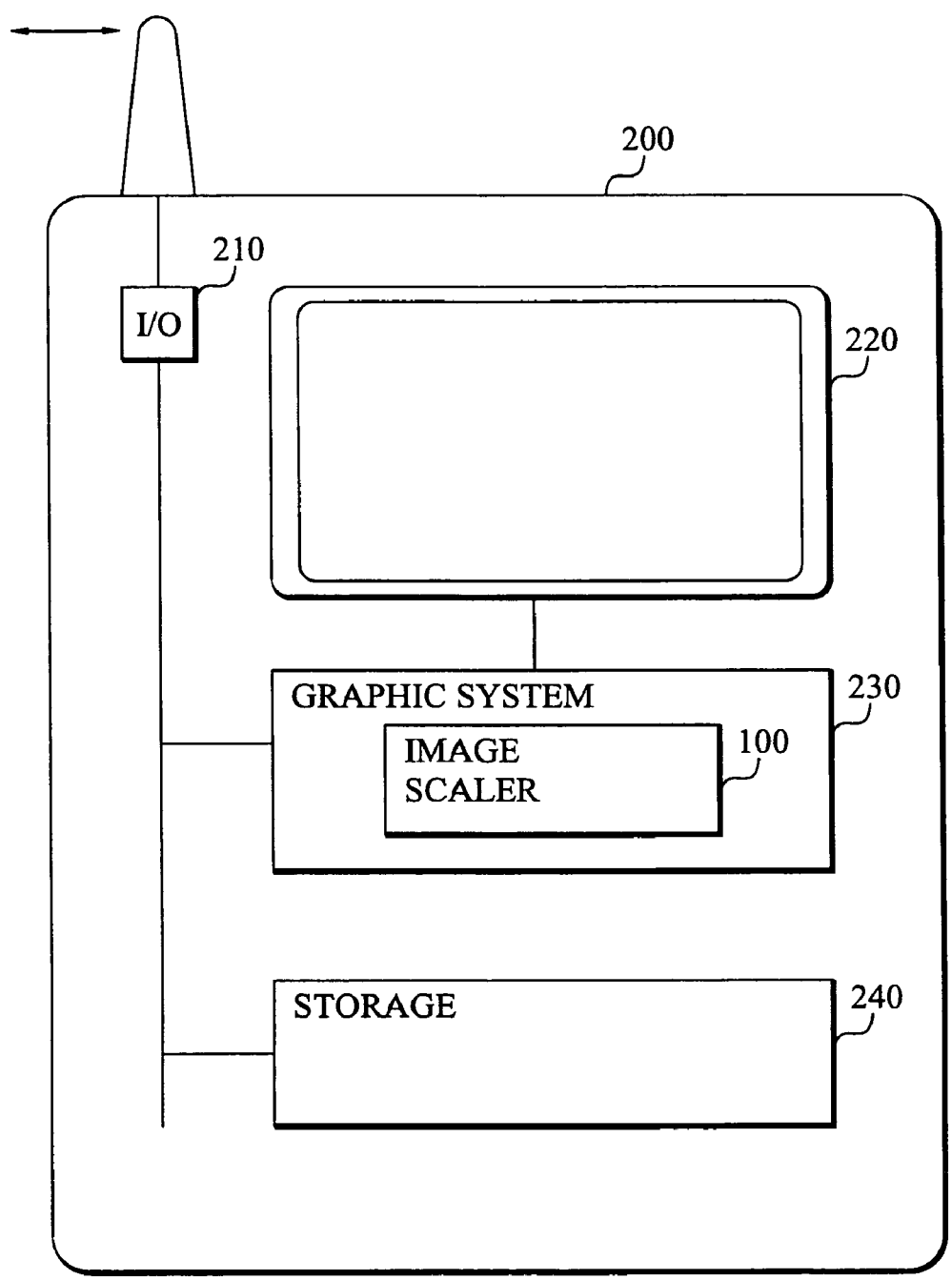

FIG. 15 is a schematic block diagram of an image processing device.

DETAILED DESCRIPTION

Throughout the drawings, the same reference characters will be used for corresponding or similar elements.

The technology in this application relates, in a particular aspect, to image scaling and provides such an image scaling that is computationally efficient but still obtains good image quality. As the image scaling is much less computationally expensive as compared to prior art scaling schemes providing comparative image quality, the present invention can advantageously be implemented in and applied to user terminals and image processing appliance having limited processing capacity, storage facilities and/or power supply. Thus, the image scaling is in particular suited for implementation in thin clients, such as laptops, Personal Digital Assistants (PDAs) and mobile telephones. However, also other image processing appliances, such as computers and dedicated image processing and displaying equipment can benefit from the technology in this application.

In the following, the is described in more detail with reference to scaling an original image to provide a scaled image. Image should be broadly interpreted as used herein and embraces any single image or sequence of images, such as in video. The image can be in the form of a 1D, 2D or 3D image or texture, such as a photograph, game type texture, text, drawing or any other type of image. Image also encompasses multi-dimensional data structures, such as 4D, 5D or 6D structures.

An image can be regarded as consisting of a multiple number of image elements. Such an image element could be a texel (texture element) of a (1D, 2D, 3D) texture, a pixel of a (1D or 2D) image or a voxel (volume element) of a 3D image. Generally, an image element is characterized by certain image-element properties, such as a color value. The number of such image elements an image consists of generally denotes the size or resolution of an image. For example, a 1024×768 image comprises 1024 rows of image elements (768 image elements per row) and 768 columns of image element (1024 image elements per column).

An image having original size or resolution of $M_O \times N_O$ image elements is scaled into a scaled image having a target resolution of $M_T \times N_T$. In this context, the whole original image is typically scaled to form the scaled target image. However, in some applications, only a portion of the image needs to be scaled. In such a case, that portion is regarded as the original image Thus, the scaling can be applied to a whole input image or only a portion thereof.

A scaling procedure is typically performed by first processing the image elements in a first row or column of the image to produce a first scaled row or column. The procedure is then continued row-by-row or column-by-column to generate a partly scaled image. This partly scaled image is then processed in a second step to form the final scaled image. This second step involves processing a first column (if the rows of the input image were processed in the first step to generate the partly scaled image) or row (if the columns of the input image were processed in the first step to generate the partly scaled image). This column or row scaling is then repeated for the remaining columns or rows of the partly scaled image.

The two scaling steps described briefly above are generally performed in a similar manner. In other words if a same row and column scaling of the original image is desired, the same filters are typically employed for the row and column scaling. Thus, the scaling can be applied to first scaling the rows of an image to form a partly scaled image. Thereafter the columns of the partly scaled image are scaled to form the final scaled image. In another embodiment, the columns of the image are first scaled to form the partly scaled image. Thereafter, the rows of this partly scaled image are processed (filtered) to form the target scaled image. Both procedures give similar results and the teachings of the technology in this application can be used for any of these embodiments. This means that the input image to be processed can be a pre-filtered image or a partly scaled/filtered image.

In another embodiment, the row and column scaling are not separated but handled in common. For example, a subset of the rows (columns) or even part-rows (part-columns) of an image is filtered (scaled) to provide a set of filtered image element rows (columns). This subset of rows can then be regarded as a portion of the partly scaled image. The columns (rows) of this portion of the partly scaled image can then be filtered to produce a portion of the final scaled image before the remaining rows (columns) of the original image are filtered or scaled. This embodiment is particularly suitable for image processing appliances having limited cache sizes so only a relatively small amount of image data can be handled and processed simultaneously. In such a case, the original image is processed in portions which are assembled to form the target scaled image. The teachings can also be applied to this and similar embodiments. In general, the image scaling can be applied to any selected procedure of image scaling independent of whether all image elements rows are first filtered, all image element columns are first filtered or one or more image element rows/columns are first filtered followed by one or more image element columns/rows.

In the present description, an image to be scaled is regarded as having an original resolution or size $N_O$ in a first dimension. This first dimension can be a row, part of a row, a column or part of a column. Thus, the original resolution $N_O$ can be regarded as a row resolution or a column resolution. Correspondingly, the scaled image has a target resolution $N_T$ in the first dimension, i.e. a row resolution or a column resolution.

The expression "one-dimensional array" of image elements is used to define a row, a part of a row, a column or a part of a column of image elements in an image. Thus, the one-dimensional array of image elements are used to denote an image element row (or part thereof) or an image element column (or part thereof).

FIG. 1 is a flow diagram illustrating a method of scaling an image In this method, an image having an original resolution $N_O$ in a first dimension is scaled into a scaled image having a target resolution $N_T$ in the first dimension. Thus, the image has an original row or column resolution $N_O$ and the scaled image has a target row or column resolution $N_T$.

In a first step S1, a filter set comprising $\alpha$ filters is provided. This number $\alpha$ is a positive integer number and is equal to a quotient of the target resolution $N_T$ and a common denominator k of the original row/column resolution $N_O$ and the target row/column resolution $N_T$. This common denominator k is a positive number larger than one and preferably represents the highest common denominator of the original row/column resolution $N_O$ and the target row/column resolution $N_T$. This corresponds to that the original resolution $N_O$ and the target resolution $N_T$ are not relative prime numbers.

Thus, the scaling factor s employed in the scaling method can be defined as:

$$s = \frac{N_T}{N_O} \quad (1)$$

The two resolutions $N_O$, $N_T$ will not be relative prime numbers if the resolutions can be written as:

$$N_O = k \times \delta$$

$$N_T = k \times \alpha \quad (2)$$

where $\alpha$, $\delta$ are two integers and $\alpha$ represents the number of filters in the filter set provided in step S1. This means that by combining equation 1 and 2 above, the scaling can be expressed as:

$$s = \frac{k}{k} \times \frac{\alpha}{\delta} = \frac{\alpha}{\delta} \quad (3)$$

As noted in the foregoing, the common denominator k is preferably the highest common denominator of the resolutions quotient but can actually be any quotient between the original resolution $N_O$ and the target row/column resolution $N_T$. The higher this common denominator k is the more efficient and less computationally expensive image scaling can be used. It is therefore preferred to use the highest possible common denominator as k or at least one of the highest common denominator if there are several such denominators larger than one for the quotient.

The provided filter set, thus, comprises $\alpha$ filters, which implies that the filter set can include one or more filters. Each such filter is characterized by a certain filter width, expressed by the number of taps. In addition, each tap has a certain tap value, typically denoted filter coefficient in the art. The complexity of an image scaling method partly depends on the computation of the filter coefficients. The filters used in image scaling are typically described as polynomials. Their width in terms of number of taps often depends on the relative sizes/resolutions of the (pre-filtered) image and the target scaled image. Where to sample a tap, i.e. determine the filter coefficient or tap value for the tap, is dependent on which image element in the partly scaled image or the target scaled image one wants to reconstruct.

The filters can be any type of prior art filter used in image scaling. For example, the filters can be Finite Impulse Response (FIR) filters, such as (windowed) sinc filter or bicubic filters, or Infinite Impulse Response (IIR) filters. The actual choice of filter type does not affect the teachings of the present invention. However, filters generally providing a high quality such as sinc and bicubic filters are preferred. Correspondingly, the length of the filters in terms of number of taps is not decisive. The present invention can therefore be applied to filters employing vastly different filter lengths from, for example, two or three taps per filter to longer filters having five, six or seven or more taps. As the present invention reduces the complexity of image scaling and reduces the number of filter coefficients that need to be determined, the technology in this application can advantageously be used together with relatively large filter lengths without a too high computational effort.

According to the prior art image scaling, computing, e.g. five, taps (filter coefficients) corresponds to evaluating a multiple degree polynomial in five points, one for each tap, and then normalizing the values so that the sum of the tap values equals one. In the prior art, such a complex procedure has to be performed for each image element to be reconstructed. This means that scaling a $M_O \times N_O$ image into a $M_T \times N_T$ scaled image, involves determining $N_T \times (M_O + M_T) \times T$ filter coefficients, where T represents the number of taps per filter. This constitutes quite a number of arithmetic operations. For example, assume that $M_O=200$, $M_T=150$, $N_O=300$, $N_T=225$, $T=5$, then 393 750 filter coefficient values have to be determined, which is quite an extensive task, especially for a thin client.

The technology in this application, in contrast, provides cyclic usage of filters, implying that for a current scan line, i.e. row or column currently processed, representing $N_T$ image elements in the scaled image, only a maximum of $\alpha$ filters need to be determined as compared to $N_T$, where $\alpha < N_T$ and typically $\alpha << N_T$.

Therefore, in a next step S2 at least one one-dimensional array of image elements in the image (such as at least one row or at least one column of image elements) is processed. This processing involves filtering, for each filter in the filter set provided in step S1, a set of at least one image element in the at least one one-dimensional array (row/column) using the filter to form a filtered image element of the (partly) scaled image. Thus, each filter of the provided filter set is used for filtering one or more image elements in the row/column to reconstruct an image element in the scaled image. The filter set comprises, as noted in the foregoing, $\alpha$ filters. This means that $\alpha$ image element sets of the row/column are filtered, each with one of the $\alpha$ filters. The number of image elements per set is typically equal to the number of taps used for the filter. For example, five image elements in a row of the original image are filtered with a first 5-tap filter to generate one image element in the scaled image, five image elements in the row are likewise filtered with a second 5-tap filter of the provided step to generate a second image element, and so on.

As the filter set comprises $\alpha$ filters, $\alpha$ image elements of the scaled image are reconstructed in this filtering step or procedure. The filtering step is then repeated up to k times over the one one-dimensional array (row/column) to form a scaled row or column of image elements in the scaled image, which is schematically represented by the line L1.

Thus, at most $\alpha$ different filters must be provided according to the present invention. These $\alpha$ filters are then applied cyclically k times over the row/column to generate a scaled row/column of image elements. Thus, the same $\alpha$ filters will be re-used in total (up to) k times to generate a complete row/column of image elements in the scaled image.

Thus, if an original row/column resolution of an image is $N_O=200$ and the corresponding target resolution is $N_T=150$, the highest common denominator $k=50$ and $\alpha=3$ (see equation 2 above). According to the present invention, when processing and filtering one row/column of the image, 3 different filters are provided and each of these three filters will be used 50 times if the whole row/column is to be scaled. Thus, only three filters need to be determined and can then be re-used in total up to 50 times as compared to a corresponding prior art approach of calculating 150 filters. This means that the technology in this application reduces the processing time required for calculating filters.

As was noted in the foregoing, the filtering step S2 is preferably performed k times to generate a complete row/column of image elements in the scaled image. However, even if a complete row or column in the scaled image is generated in the end, the filtering and forming step S2 need not be repeated k times one after the other. It could be possible to first only perform the step S2 a few times to reconstruct some of the image elements of a row/column in the scaled image. One or more other rows/columns in the original image can then be processed and filtered before returning to the first row/column and generating the remaining image elements of that row/column.

The method then ends.

The filtering and scaling are preferably applied to both the rows and columns of an image. Thus, an image having an original row resolution $N_O$ and original column resolution $M_O$ is scaled into a scaled image having a corresponding target row resolution $N_T$ and target column resolution $M_T$. In such a case, the providing step S1 of FIG. 1, preferably comprises providing a first filter set comprising $\alpha$ filters, where this number $\alpha$ is defined as the quotient of the target row resolution $N_T$ and a common denominator k of the original row resolution $N_O$ and the target row resolution N. The providing step S1 also comprises providing a second filter set comprising $\beta$ filters, where this number $\beta$ is defined as the quotient of the target column resolution $M_T$ and a common denominator l of the original column resolution $M_O$ and the target column resolution $M_T$. In addition, both denominators k,l are positive numbers larger than one.

The filtering step S2 is then performed by forming, for each filter in the first filter set and for at least one row in the original image, a filtered image element of a partly scaled image. This image element formation constitutes filtering a set of at least one image element in the at least one row using the current filter. The forming step is then repeated k times over the at least one row to form a scaled row of image elements of the partly scaled image. This procedure is preferably repeated for all rows in the original image.

Thereafter the partly scaled image is processed by forming, for each filter in the second filter set and for at least one column of image elements in the partly scaled image, a filtered image element of a final scaled image. This forming step involves filtering a set of at least one image element in the at least one column using the current filter from the second set. This forming step is then repeated to be performed l times over the at least one column to form a scaled column of the scaled image. This procedure is preferably repeated for all columns in the partly scaled image.

In an alternative embodiment, the columns are first filtered followed by the rows. This involves filtering, for each filter in the second filter set, a set of at least one image element in at least one column of the original image. This filtering generates a filtered image element of a partly scaled image. The filtering operation is repeated in total l times over the at least one column to form a scaled column of the partly scaled image. This is preferably performed for all columns in the image element The rows of the partly scaled image are then filtered by forming, for each filter in the first filter set, a filtered image element of the final scaled image by filtering a set of at least one image element in at least one row using the current filter. The row filtering is repeated for k times over the at least one row to form a scaled row of image elements of the scaled image. This procedure is preferably repeated for all rows in the partly scaled image.

Figure 2:
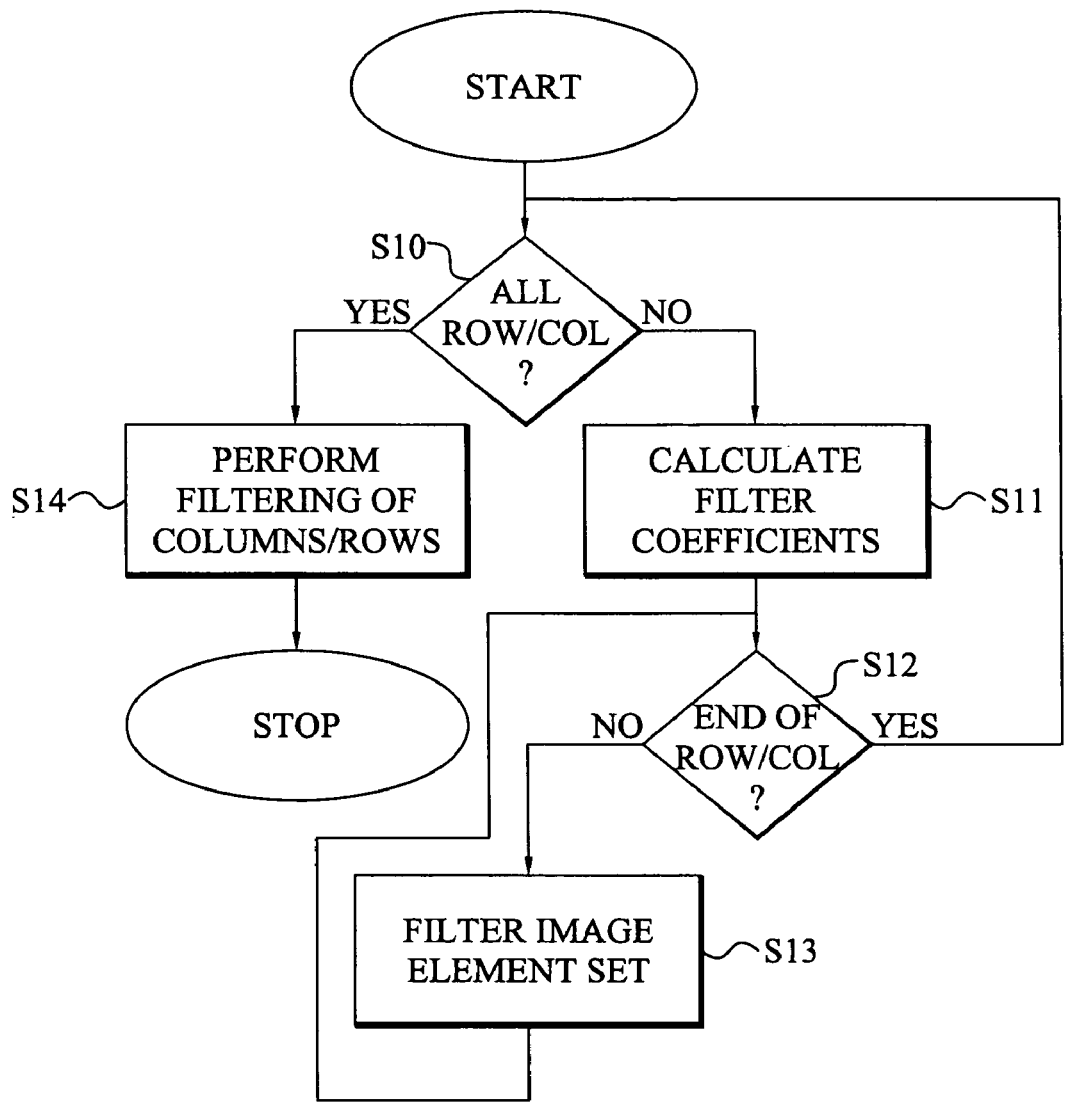
FIG. 2 is flow diagram illustrating an image scaling method.

FIG. 2 is a flow diagram depicting another example embodiment of image scaling. The method starts in step S10, which investigates whether all rows (or columns) in the original image have been filtered. Since the method typically started, no such row (column) has yet been filtered and the method continues to step S11. In this step S11, filter coefficients for the α filters to use for a current row (column) are calculated. This calculation involves determining α×T filter coefficients if each filter consists of T taps.

In a next step S12, it is investigated whether the end of the current row (column) is reached. In other words, this step S12 investigates whether all image elements in the row (column) of a partly scaled or intermediate image has been generated by filtering image elements of the original image.

If not all image elements have been formed the method continues to step S13, where a set comprising at least one image element of the current row (column) in the image is filtered using one of the α filters calculated in step S11 to form an image element of the partly scaled image. The method then continues to step S12, where a new investigation is performed to check whether the complete image element row (column) has been formed yet. If not completed, the method continues to step S13 where a new set of image elements of the current row (column) are filtered with one of the calculated filters.

The loop of step S12 and S13 can be performed by, in an implementation where α=3 and k=50, filtering a first image element set with a first filter $\alpha_1$ to form a first image element, filtering a second image element set with a second filter $\alpha_2$ to form a second image element, filtering a third image element set with a third filter $\alpha_3$ to form a third image element, filtering a fourth image element set with the first filter $\alpha_1$ to form a fourth image element, filtering a fifth image element set with the second filter $\alpha_2$ to form a fifth image element, and so on until each filter has been employed 50 times. In such an implementation, the different image element sets of the row (column) are typically neighboring sets, fully or partly overlapping along the row (column). Thus, the first and second set can include the five first image elements in the row (column), the third set includes image element number two to six in the row, the fourth set consists of image element number three to seven and so forth.

Alternatively, a given filter of the filter set can be used first up to 50 times, in this illustrative example, for filtering different image elements along the current row (column) before employing another filter of the filter set. The end result will be the same in these two embodiments. The technology in this application can also be applied to any other implementations basically being an intermediate of these two extreme embodiments, i.e. employing a given filter a few times before using one or more other filters and then anew employing the given filter.

When the loop of S12 and S13 has been performed enough times to generate a complete row (column) of the partly scaled image, the method continues from step S12 to step S10. The step S11 and the loop consisting of steps S12 and S13 are then preferably repeated for all rows (columns) of the original image. Once all rows have been completed a partly scaled or intermediate image is obtained. This intermediate image is input image to the step S14, which performs a filtering of the columns (rows) of the intermediate image to obtain the final scaled image. This step S14 basically corresponds to steps S10, S11, S12 and S13 with a few differences. The input image is the partly scaled image and not the prefiltered image and the filtering is performed along columns (rows) and not rows (columns).

Thus, a size of the original image is $M_O \times N_O$, a size of the intermediate image is $M_O \times N_T$ and a corresponding size of the scaled image is $M_T \times N_T$. The filtering of the image element rows involves calculating $$\alpha = \frac{N_T}{k}$$

filters per row and in total $$M_O \times \alpha = M_O \times \frac{N_T}{k}$$

filters for the complete row filtering. The corresponding numbers for the column filtering of the partly scaled image are $$\beta = \frac{M_T}{l}$$

filters per column and in total $$N_T \times \beta = N_T \times \frac{M_T}{l}$$

filter for the complete column filtering. The total number of filters required to be calculated in the embodiment illustrated in FIG. 2 if the complete original image is scaled becomes $$M_O \times \alpha + N_T \times \beta = M_O \times \frac{N_T}{k} + N_T \times \frac{M_T}{l}.$$

Assume that $M_O$=300, $M_T$=225, $N_O$=200 and $N_T$=150, then α=3, k=50 and β=3, l=75. This means that 450 filters need to be calculated. The corresponding prior art number, without the cyclic usage of filters, becomes $N_T \times (M_O + M_T)$=78750. Thus, only about 0.6% of the prior art filters need to be determined in this embodiment of the invention.

Figure 3:
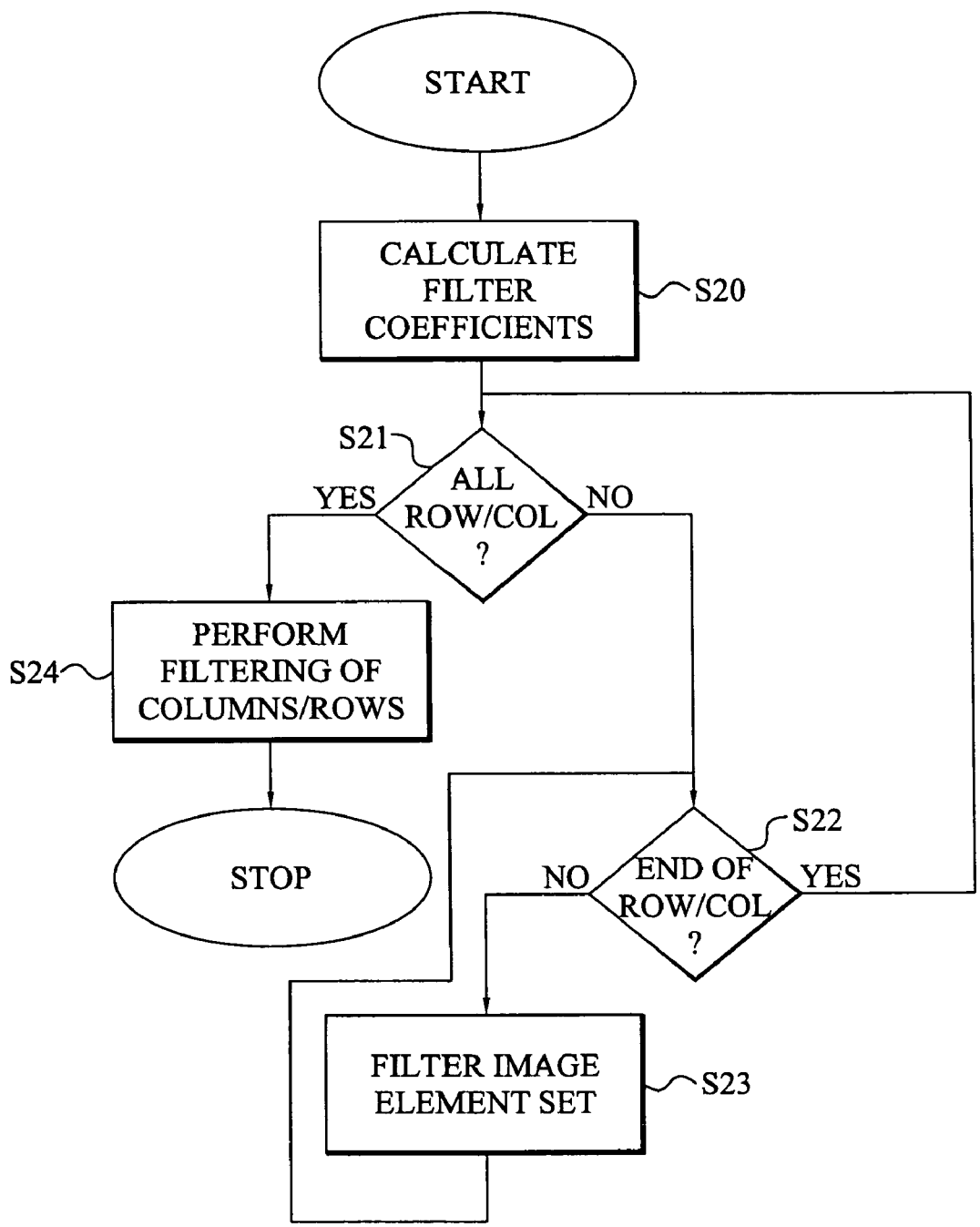
FIG. 3 is flow diagram illustrating an image scaling method.

FIG. 3 is a flow diagram of another example embodiment of the image scaling method. In this embodiment, filters calculated for a first row (column) are stored in a memory or cache and are employed for the remaining rows (columns) of the image. The same procedure is then preferably repeated for the column (row) filtering. A first step S20 calculates the filter coefficients of the α filters in the filter set. The filter coefficients are then stored in a cache/memory. The method then continues to steps S21 and S22, which correspond to steps S11 and S12 of FIG. 2 and are not described further herein. In the step S23, the calculated filters from step S20 are used for filtering a set of image elements in the row (column) of the image to form an image element of the partly scaled image. Thus, the filter coefficient values are read from the cache or memory when required in the filtering step S23. The steps S21, S22 and S23 are then preferably repeated to filter all rows (columns) of the original image to form the partly scaled image. The method then continues to step S24, where the columns (rows) of the partly scaled image are filtered to form the final scaled image. This step S24 basically corresponds to performing steps S20, S21, S22 and S23 anew but for the columns (rows) in the partly scaled image instead of the rows (columns) in the original image.

In this embodiment, $$\alpha = \frac{N_T}{k}$$

filters are calculated for the row filtering and $$\beta = \frac{M_T}{l}$$

filters for the corresponding column filtering. Using the above presented example numbers, this amounts to calculating six filters, which constitutes less than 0.1 per thousand of the corresponding prior art solution.

A method of scaling an image having multiple rows/columns into a scaled image having multiple rows/columns is provided. The method comprises the steps of:

a) calculating filter coefficients of multiple filters;
b) filtering sets of at least one image element of a first row/column of said image using said multiple filters to form a row/column of filtered image elements in said scaled image;
c) storing said filter coefficients in a memory; for at least a second row/column of image elements in said image:
d) retrieving said filter coefficients from said memory; and
e) filtering sets of at least one image element of said at least second row/column of said image using said retrieved filter coefficients to from at least a second row/column of filtered image elements in said scaled image.

Figure 4:
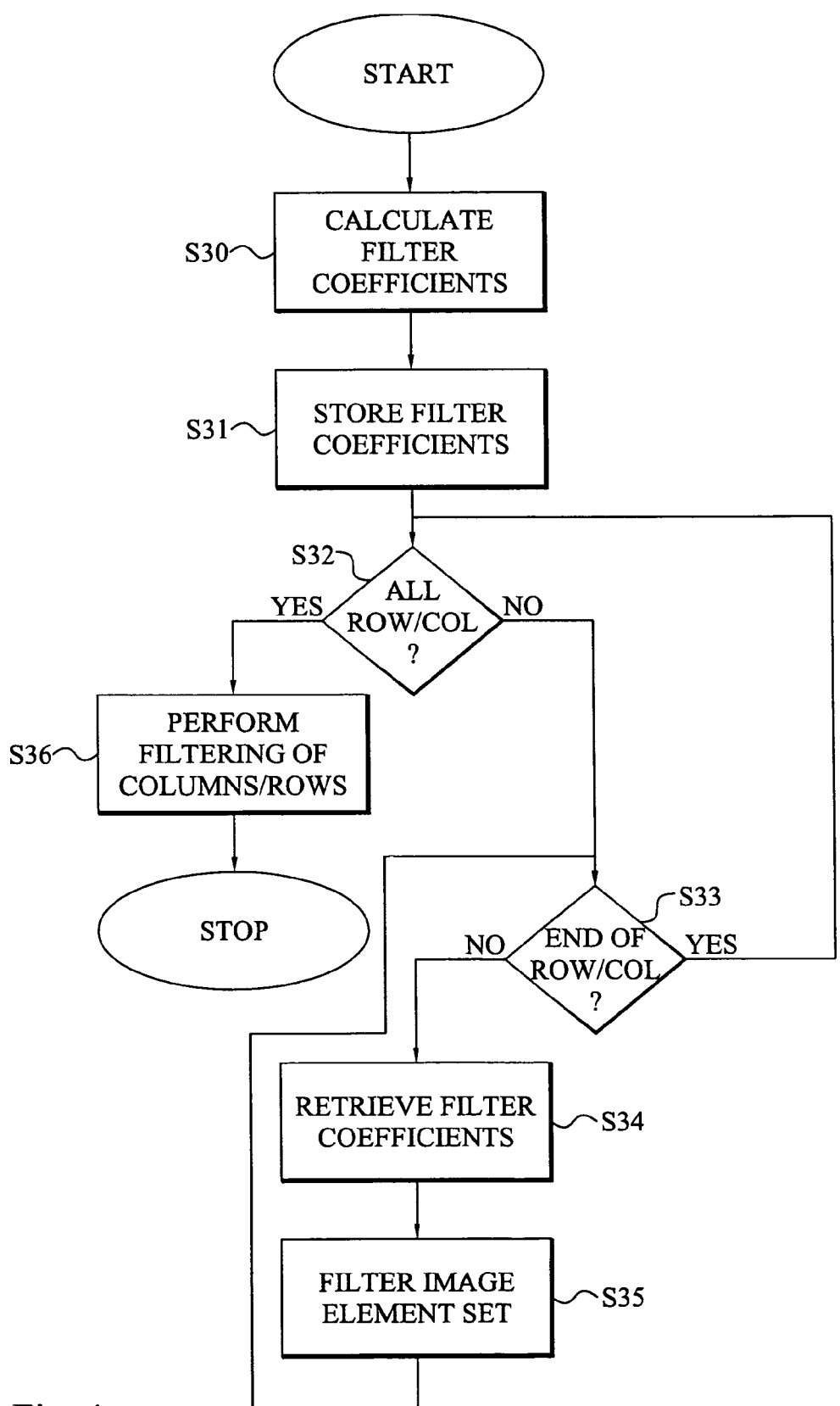
FIG. 4 is flow diagram illustrating an image scaling method.

In the embodiment presented above and illustrated in FIG. 3, filter coefficients for α filters of a first row or column are calculated and then used throughout this first row (column) and also for the remaining rows (columns) of the image. FIG. 4 is a flow diagram of a further embodiment of the image scaling method of the present invention. This embodiment takes one step further as compared to FIG. 3 since, during the actual image scaling, actually no filter coefficients need to be calculated. Instead pre-calculated filter coefficients are loaded and fetched from a filter bank and used during the image element filtering.

In image downscaling (minification), only scaling factors s in the interval 0.5<s<1 are needed since otherwise box-filtering or other pre-filtering techniques can be used in one or more steps to halve the image resolution until it is less than two times larger than the target resolution. The filter bank would then comprise different filter sets, where each filter set comprises one or more filters and is designated for a defined scale factor.

The method starts in step S30, where filter coefficients for filters in the different sets of the filter bank are calculated. The filter coefficient values depend on the original resolution and the target resolution, more precisely the scale factor or quotient between the target and original resolution. Thus, different possible such scale factors and the number of filters required per scale factor is defined. For example, if the scale factor $$s = \frac{\alpha}{\delta},$$

α filters are required for this particular factor and constitutes a filter set. The number of filter coefficients per filter need also be determined and this determination becomes a compromise between image quality (higher quality with more coefficients) and computationally complexity (higher complexity with more coefficients).

The calculated filter coefficients of the filters in the different filter sets are then stored in a memory, such as in a slow and cheap memory, in step S31. These calculation and storing steps S30, S31 are typically performed once for all applicable scale factors and prior the actual image scaling. Once an image is to be scaled according to this example embodiment, the method continues to steps S32 and S33, which basically correspond to steps S10 and S11 of FIG. 2 and are not described further herein. In a next step S34, the scale factor applicable for the current image scaling is then determined as the quotient of the target and original row or column resolution. The filter set associated with the determined scale factor is then identified and the filter coefficients of the filters in the identified filter set are retrieved from the (slow) memory. In this procedure, the filter coefficients can be uploaded onto a fast on-chip or cache memory. A set of at least one image element in the image is then filtered with one of the filters in the retrieved filter set to form a filtered image element of the scaled image. The loop of steps S33, S34 and S35 is preferably repeated for multiple image element sets to form a complete row or column of the scaled image. In such a case, the retrieving step S34 corresponds to fetching the filter coefficients of one of the α filters from the (fast) memory or cache.

All columns or rows of the image are then preferably processed as defined by the loop of the steps S32, S33, S34 and S35 to form a partly scaled image. Note that since all rows or columns (rows/columns) of the image and the partly scaled typically have the same number of image element, a same filter set will be used for all rows. The method then continues to step S36, where the columns or rows of the partly scaled image are filtered to form the final scaled image. This step S36 basically corresponds to steps S32, S33, S34 and S35 as previously described but the input image is the partly scaled image and the columns (or rows) are filtered instead of the rows (or columns). In this column scaling a same or different filter set of the filter bank can be used as was employed for the previous row scaling. The method then ends.

No filters at all need to be calculated during the image scaling according to this embodiment of the present invention. The coefficient calculation is therefore replaced by memory/cache accessing and coefficient retrieval, which is a comparatively cheaper task for most image processing units.

As the person skilled in the art understands, there exist a vast amount of possible scale factors in the interval [0.5, 1], actually an infinite amount of such factors. In practical implementations, therefore filter coefficients will be calculated for only a limited amount of scale factors. This can be done by listing all rationals between 0.5 and 1 of integers between one and another number, such as 16 as done in Table I below.

TABLE I rationals (α/δ) in the interval 0.5<α/δ<1, where 1 ≦ α, δ ≦ 16

| α/δ | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | | | | | | | | | | | | | | | | |
| 2 | | | | | | | | | | | | | | | | |
| 3 | | 2/3 | | | | | | | | | | | | | | |
| 4 | | | 3/4 | | | | | | | | | | | | | |
| 5 | | | 3/5 | 4/5 | | | | | | | | | | | | |
| 6 | | | | 4/6 | 5/6 | | | | | | | | | | | |
| 7 | | | | 4/7 | 5/7 | 6/7 | | | | | | | | | | |
| 8 | | | | | 5/8 | 6/8 | 7/8 | | | | | | | | | |
| 9 | | | | | 5/9 | 6/9 | 7/9 | 8/9 | | | | | | | | |
| 10 | | | | | | 6/10 | 7/10 | 8/10 | 9/10 | | | | | | | |
| 11 | | | | | | 6/11 | 7/11 | 8/11 | 9/11 | 10/11 | | | | | | |
| 12 | | | | | | | 7/12 | 8/12 | 9/12 | 10/12 | 11/12 | | | | | |
| 13 | | | | | | | 7/13 | 8/13 | 9/13 | 10/13 | 11/13 | 12/13 | | | | |
| 14 | | | | | | | | 8/14 | 9/14 | 10/14 | 11/14 | 12/14 | 13/14 | | | |
| 15 | | | | | | | | 8/15 | 9/15 | 10/15 | 11/15 | 12/15 | 13/15 | 14/15 | | |
| 16 | | | | | | | | | 9/16 | 10/16 | 11/16 | 12/16 | 13/16 | 14/16 | 15/16 | |

In a preferred implementation, the filter bank comprises $2^{p-1}-1$ filter sets $S_i$, $i=0, \ldots, 2^{p-1}-2$, where p is an integer equal to or larger than 2. Such a filter set $S_i$ comprises no more than $i+2^{p-1}+1$ filters and has an associated defined scale factor $$s_i = \frac{i+2^{p-1}+1}{2^p}.$$

For example, if p=3, three different filter sets $S_0$, $S_1$, $S_2$ are available. The filter sets comprises 5, 6 and 7 filters, respectively and are used for scale factors 5/8, 6/8 and 7/8, respectively. In a preferred implementation, p is four, five or more. If p=5, on average $$\frac{17+18+\ldots+30+31}{15} = 24$$

filters per filter set are needed. Using eight taps per filter and one byte per tap, 15×24×8=2 880 bytes or less than 3 kB is required.

In the discussion above in connection with FIGS. 2 to 4, both column and row filtering have been used. However, in some applications it could be sufficient to merely scale and thereby filter the rows or columns of an image. For example, switching between wide and normal screen format of an image can be conducted according to the present invention by merely scaling the rows of the original image. Such an image filtering is also within the scope of the present invention.

FIGS. 5A to 5C schematically illustrates scaling an original image 10, FIG. 5A, through an intermediate or partly scaled image 20, FIG. 5B, to a final scaled image 30, FIG. 5C. Each image 10, 20, 30 consists of image elements 12, 22, 32 organized into rows 16, 26, 36 and columns 18, 28, 38. The original image 10 comprises a number of rows 16 and columns 18 of image elements 12.

In this illustrative example, the rows 16 of the original image 10 are filtered to form the partly scaled image. In addition, a filter length of three taps has non-limitedly been used. Thus, a set 14 of the three first image elements A, B, C are filtered using a first filter 1 in order to obtain an image element A', that is stored in the intermediate image 20. The same three image elements 12, A, B, C, can also be filtered to generate a next image element B' in the first row 26 of the intermediate image 20. However, in this case a different filter 2 is used in the image element filtering. Then, filter 3 employs a set 14 comprises the next three image elements B, C, D in order to produce the image element C', etc.

The filtering may be performed in a cyclic manner. In this case, the target row resolution is six image elements and the original row resolution is four image elements. The highest common denominator will therefore be two and the quotient between the target row resolution and the common denominator becomes three. This implies that three different filters are required for filtering a complete row 16 and that each filter will be used twice. Thus, the next three image elements C, D, E are filtered by filter 1 to generate image element D', the next filter 2 filters image elements D, E, F to produce image element E' and the final image elements F, G, H can be filtered with filter 3 to reconstruct image element F'.

These three filters are then employed for filtering the remaining rows 16 of the original image 10 to produce the partly scaled image 20 illustrated in FIG. 5B.

After having filtered in the x-direction (rows), the same process is repeated in the y-direction, i.e. for the columns 28 of the partly scaled image 20. This time filter 1' is used to filter the intermediate image element values A', I', Q' in order to produce image element A" in the final scaled image. Analogously, filter 2' is used on values A', I', Q' to produce image element I" and filter 3' filters the values I', Q', Y' in order to reconstruct the image element Q". Also in this column filtering, the filters 1', 2', 3' will be used twice in order to generate a complete column 38 of image elements 32 in the final image 30. The procedure is continued with the remaining columns 28 using the same filter coefficients as for the first column 28 to finish the scaling.

It is also anticipated that so called 2D filters can be used instead of 1D filters in the scaling of an image. In 1D filters, each filter consists of a number of filter coefficients or taps that are used for processing a set of image elements in a row or column. In clear contrast, a 2D filter can be regarded as a matrix of filter coefficients. In the line with the 3tap filters used in FIGS. 5A to 5C, a 2D filter could for example be a 3×3 matrix. In such a case, the filter is applied to a set of, in this case, 3×3=9 image elements of different rows and columns in the original image (FIG. 5A) to generate an image element of the scaled image (FIG. 5C). In such an approach, rows and columns of the original image are processed (filtered) together. This implies that generally no partly scaled image need to be determined, implying that the filtering method starts with the original image (FIG. 5A) and directly generates the final scaled image (FIG. 5C), or a portion thereof The usage of 2D filters is particularly advantageous in cases where read and copy operations are cheap whereas write operations are expensive.

FIG. 6 is a diagram schematically illustrating a portion of a row 16 of image elements 12 in an original image and a corresponding row 26 of image elements 22 in a scaled or partly scaled image. As was briefly mentioned in the foregoing, an image element 12 is characterized by a color value, such as a red, green, blue (RGB) color or some other color format used for representing images (including YUV format or YCrCb format). This means that each image element 12 then has an assigned red value, a green value or a blue value, typically ranging between 0 and 255 for an implementation with 256 different levels per color. In FIG. 6, the actual value or intensity of one of the color components is illustrated by standing arrows 50 for some of the image elements 12 of the row 16.

Windowed sinc functions 40, 42, 44 having five taps are used in this example for filtering the image elements 12 in the original row 16. When constructing an image element 22A in the scaled row 26, the global maximum of sinc function 40 is aligned with the center of the image element 22A. As a filter length of five taps is employed in this example, a set 14 of five image elements 12 in the original row 16 covered by the function 40 is identified. The values 41 of the sinc function 40 at the central position of these image elements 12 are then calculated and used as filter coefficients for this first filter. These values 41 are marked as filled circles in the figure and could have the normalized values [−0.2, 0.2, 1.0, 0.2, −0.2]. The correct color value for the image element 22A is then obtained by weighting the corresponding color values 50 of the set 14 of image elements with the calculated filter coefficients.

The sinc function 42 is then "moved" to be centered at the next image element 22B in the scaled row 26. The corresponding filter coefficients are in this case marked with filled squares. This procedure is repeated for the following image element 22C and sinc function 44 with filter coefficients marked as filled triangles. However, for a fourth image element 22D of the scaled row 26, the same filter 40 and filter coefficients as for the image element 22A can be used. This figure, therefore, clearly illustrates how the cyclic reuse of filters and filter coefficients arise and can be employed to relax the need of determining a vast amount of filter coefficients during image scaling.

The cyclic filtering that allows for reduced need of determining filters by reusing a same filter multiple times along a row or column and preferably also between different rows or columns depends on the fact that the original and target row or column resolutions are not relative primes. For example, assume the original resolution $N_O$ =203 and the target resolution $N_T$ =150. The highest common denominator of these two resolutions is one, implying that no cyclic use of filters is possible with the scale factor $$s = \frac{150}{203}$$

and therefore 150 different filters must be determined per row or column. The technology in this application solves this problem by changing the scale factor, implying that either the original resolution and/or the target resolution is adjusted so that the common denominator becomes larger than one.

In a first embodiment of this scale factor adjustment, illustrated in FIG. 8, the image scaling method involves selecting a candidate original (row or column) resolution $N_O^c$ that is smaller than the original row/column resolution $N_O$ in step S40. In addition, the candidate original resolution is selected such that a common denominator k of the candidate original resolution and the target resolution $N_T$ is a positive number larger than one. For example, if the target resolution is 150 and the original resolution is 203, a suitable candidate original resolution is 200. In such a case, the common denominator k becomes 50 with the selected candidate original resolution of 200. In this selecting step S40, the candidate resolution is preferably close to the original column/row resolution but preferably also results in a large common denominator with the target resolution. Thus, it could be possible to choose a candidate original resolution of 202, which is closer to the original resolution of 203 as compared to 200. However, in such a case the highest common denominator with the target resolution only becomes 2 as compared to 50. This in turn implies employing 75 different filters twice when processing a row or column of the original image as compared to employing only 3 filters cyclically 50 times.

There may therefore be a trade-off between selecting a candidate original resolution that is as close to the original resolution as possible for an image to be scaled (otherwise the resulting scaled image lacks portions of the original image) and selecting a candidate original resolution that results in as large highest common denominator as possible (which increases the re-use of filters along rows/columns being filtered and thereby reduces the complexity of the image filtering).

Once a suitable candidate original row/column has been selected in step S40, the original image becomes cropped in step S41 by performing the image element filtering for only $N_O^c$ sets of image elements in a current row or column instead of filtering $N_O$ image element sets ($N_O^c < N_O$). This can simply be realized by skipping some image elements in the beginning and/or end of the row or column to be filtered. These so-called skipped image elements can, however, sometimes be used for filtering the border elements of the target image, especially if the filter lengths are rather long. This means that the need for image mirroring/extrapolation at image borders becomes somewhat relaxed. For example, when having a candidate original resolution of 200 and an original resolution of 203, the cropping step S41 can be performed by disregarding the leftmost image element and the two rightmost image elements when filtering a row and disregarding the uppermost image element and the two lowest image elements when filtering a column. The method continues to step S1 of FIG. 1, where the filtering only will be performed on a portion of the original image.

FIG. 7A schematically illustrates this example embodiment. The leftmost figure illustrates an original image 10 to be scaled or filtered. In this case, candidate original resolutions have been selected for both the original row and original column resolutions. The middle figure illustrates the portion of the original image that actually becomes scaled due to selecting candidate row and column resolutions that are smaller than the respective original resolutions. Therefore only those image elements of the image 10 enclosed by the inner frame are filtered to form the target scaled image 30 in the rightmost figure of FIG. 7A.

In another embodiment that handles the case with a highest common denominator of the original and target resolution of one, a candidate target resolution $N_T^c$ that is larger than the target row/column resolution $N_T$ is selected in step S50 of FIG. 9. In addition, this selecting step S50 comprises selecting the candidate target row/column resolution so that a common denominator k of the original resolution $N_O$ and the candidate target resolution $N_T^c$ is a positive number larger than one. For example, assume that the original resolution is 200 and the target resolution is 149. The selecting step S50 can then select the candidate target resolution to become 150, which results in a highest common denominator of 50.

The next two steps S51 and S52 basically correspond to steps S1 and S2 and are not described further herein. These two steps are preferably performed for all image rows and columns to form a scaled image, which is schematically illustrated by the line L8. The resulting scaled image, however, have a resolution in at least one of its dimensions, i.e. row or column, that exceeds the target resolution. This embodiment solves the problem by cropping the scaled image in the next step S53. This cropping embodiment involves deleting or disregarding $N_T - N_T^c$ image elements in the scaled rows/columns. The method then ends.

FIG. 7B illustrates this situation. In the leftmost figure, the original image 10 is illustrated. The middle figure illustrates the scaled image 10 resulting from usage of candidate target row and column resolutions that are larger than the corresponding target resolutions. Thus, the scaled image 30 is actually too large to be fully displayed on the display screen. Therefore, only those image elements of the scaled image present within the inner frame of the rightmost figure of FIG. 7B actually becomes displayed.

The two embodiments described in FIGS. 8 and 9 and illustrated by FIGS. 7A and 7B involves image cropping, either by disregarding or deleting image elements of the original image or in the scaled image. Removing or disregarding a few image elements in this manner is usually not noticeable for a viewer, especially if the original image is a photo or a video. However, for certain images, such as images depicting a frame or other objects aligned with the edge of the original image, it can be noticeable. In such a case, one of two other example embodiments described below is preferably instead employed.

The cropping of image elements in the two preceding embodiments are preferably performed as in such a manner that outermost or edge image elements are disregarded or removed in or from the original image or scaled image. Thus, if an even number 2l of image elements, where l is an integer number, should be cropped away per row (or column), preferably the first l and the last l image elements per row (or column) are cropped. If the number is instead odd, the cropping is preferably performed to form as a central resulting image as possible, see FIGS. 7A and 7B.

In addition, the two image element cropping embodiments can be combined. In such a case, a candidate original row resolution being smaller than the original row resolution can be used when filtering the rows and a candidate target column resolution that is larger than the target column resolution is used for column filtering, or vice versa.

FIG. 10 is a flow diagram illustrating an embodiment which can be used if the highest common denominator of the original and target resolution is one but no image cropping is desired. In this case, a candidate target resolution $N_T^c$ that is smaller than the target row/column resolution $N_T$ is selected in step S60 of FIG. 9. In addition, this selecting step S60 comprises selecting the candidate target row/column resolution so that a common denominator k of the original resolution $N_O$ and the candidate target resolution $N_T^c$ is a positive number larger than one. For example, assume that the original resolution is 203 and the target resolution is 150. The selecting step S60 can then select the candidate target resolution to become 145, which results in a highest common denominator of 29.

The next two steps S61 and S62 basically correspond to steps S1 and S2 and are not described further herein. These two steps are preferably performed for all image rows and columns to form a scaled image, which is schematically illustrated by the line L9. The resulting scaled image, however, have a resolution in at least one of its dimensions, i.e. row or column, that is smaller than the target resolution. This example embodiment solves the problem by adding $N_T-N_T^c$ image elements to the scaled image in the next step S63. The method then ends.

These added image elements will form a (artificial) border or frame that becomes added, preferably to one or more sides of the scaled image. In a preferred implementation, the added image elements have a defined image color, such that all added image elements are of one and the same color, such as white or black. In an alternative embodiment, the color of each added image elements is selected to be as close to the color of a neighboring image element in the scaled image. This may, however, lead to visual artefacts of the scaled image and a one-colored border is most often preferred.

FIG. 7C illustrates this principle. The leftmost figure illustrates an original image 10 to be scaled. In this image scaling candidate target row and column resolutions being smaller than the corresponding target resolutions have been employed to form the scaled image 30 in the middle figure. In order to obtain the desired target resolutions, image elements having a defined (black) color are added around the scaled image to form a frame or border 60 in the rightmost figure.

FIG. 11 illustrates another border adding example embodiment. In this embodiment, a candidate original resolution $N_O^c$ that is larger than the original row/column resolution $N_O$ in step S70. In addition, the candidate original resolution is selected such that a common denominator k of the candidate original resolution and the target resolution $N_T$ is a positive number larger than one. For example, if the target resolution is 150 and the original resolution is 203, a suitable candidate original resolution could be 204. In such a case, the common denominator k becomes 6 with the selected candidate original resolution of 204.

Since the candidate original row/column resolution is larger than the original resolution of the row/columns in the image, $N_O^c-N_O$ image elements are added, in step S71, per image row or column in the original image before or in connection with performing the row/column filtering. As described above, the added image elements preferably forms a border of a defined color, such as a one-colored border. The original image with the border is then scaled and filtered by continuing to step S1 of FIG. 1.

FIG. 7D illustrates the principles of the embodiment described above in connection with FIG. 10. The leftmost figure illustrates the original image 10 to be scaled. However, before scaling one-colored (black) image elements are added around the image 10 to form a border 60 and thereby enable a cyclic usage of filters in the row and column filtering of the image 10. This original image 10 with the border 60 illustrated in the middle figure is then scaled according to the teachings of the present invention to form the target image 30 having black borders 60 in the rightmost figure.

A border may sometimes not be a good choice. Firstly it is noticeable to the eye of the viewer since the viewer has a good idea of the limits of the display screen. Secondly, if the scaled image will be further processed, such as compressed and subsequently decompressed or transcoded, a border will lower the efficiency of the motion compensation for the video coding stage.

The cropping or border adding embodiments can be applied in one or more dimensions of the image. Thus, cropping/addition can be performed on the image rows, performed on the image columns or performed on the image rows and columns.

In addition, the different example embodiments present above can be combined. Thus, any of the four different embodiments can be performed for the image row scaling and any of the four different embodiments can be performed for the image column scaling. Therefore, image cropping can be performed on the rows of the original or scaled image whereas image border addition is made on the columns of the original or scaled image, or vice versa.

The embodiments presented above can be used if the highest common denominator of the original resolution and the target resolution in one dimension is one in order to enable cyclic usage of filters along that dimension. However, even if the highest common denominator is larger than one, it can still be advantageous to select a new candidate original or target resolution. The reason for this would then be to increase the highest common denominator even further and thereby reduce the number of filter that have to be calculated per image row or column by increasing the number of times each filter can be used along a row or column. Thus, quality in terms of image cropping or border addition can be somewhat sacrificed for the purpose of reducing the complexity of the image scaling operation by reducing the number of filters that have to be calculated. In such a case, the image scaling can include a comparison operation, where the highest common denominator of the original row/column resolution and the target row/column resolution is compared to a minimum threshold. If the highest common denominator is smaller than a minimum threshold a candidate original or target resolution is selected to result in a larger highest common denominator, otherwise the filtering is performed with the current original and target resolutions.

The teachings and the different embodiments presented and described herein can of course also be applied to image upscaling (magnification) in addition to downscaling (minification). The only difference is that the target row/column resolution is larger than the original row/column resolution.

FIG. 12 is a schematic block diagram of an image scaler 100 according to the present invention. The image scaler 100 basically comprises an image provider 10 for providing an original image to the scaled and filtered by the scaler 100. This image provider 110 can be in the form of a general input and output (I/O) unit that is adapted for receiving the original image through a wired or wireless transmission from an external image source or image relaying unit. In another embodiment, the image provider 110 is a local image source or connected to such an image source, such as a digital camera of or connected to the image scaler 100. In a further embodiment, the image provider 110 can provide the original image from a local image memory 120 that schematically can represent one or more memories, including long-term and slow memories and fast caches.

The original image provided by the image provider 110 has an original resolution $N_O$ in a first dimension is to be scaled into a scaled image having a target resolution $N_T$ in the first dimension. The image scaler 100 therefore comprises a filter set provider arranged for providing a filter set comprising α filters. This number α is equal to a quotient of the target resolution $N_T$ and a common denominator k of the original resolution $N_O$ and the target resolution $N_T$. In addition, the common denominator k is a positive number larger than one. The filter set provided by the set provider 130 and the original image provided by the image provider 110 are brought to a filter manager 140 that performs the actual image scaling by filtering one-dimensional arrays (rows and/or columns) of image elements. Thus, the filter manager is arranged for forming, for each filter in the filter set from the provider 130 and for at least one one-dimensional array of image elements in the image, a filtered image element of the scaled image by filtering a set of at least one image element in the at least one one-dimensional array using the filter. The filter manager 140 further repeats the image element formation up to k times over the at least one one-dimensional array to form a scaled one-dimensional array of image elements of the scaled image.

In a typical implementation the filter manager 140 repeats the image element forming operation k times over the row or column (one-dimensional array) for form a complete scaled row or column. Furthermore, the filter manager 140 is preferably configured for processing multiple, preferably all, rows or columns of the image to form multiple scaled rows or columns.

The image scaler 100 can be used for scaling only one dimension of an image, such as the rows or columns, or scale both rows and columns. In the latter case, the image has an original row resolution of $N_O$ and an original column resolution of $M_O$. The scaled image has a corresponding target row resolution of $N_T$ and a corresponding target column resolution of $M_T$. In this implementation, the filter set provider 130 is arranged for providing a first filter set comprising $\alpha$ filters. The number $\alpha$ is equal to a quotient of the target row resolution $N_T$ and a common denominator k of the original row resolution $N_O$ and the target row resolution $N_T$, which common denominator k is a positive number larger than one. The filter set provider 130 is also arranged for providing a second filter set comprising $\beta$ filters. This number $\beta$ is equal to a quotient of the target column resolution $M_T$ and a common denominator l of the original column resolution $M_O$ and the target column resolution $M_T$, which common denominator l is a positive number larger than one.

The filter manager 140 can then perform the image filtering by first filtering all rows, filtering all columns or first filter some rows or columns. In the first case, the filter manager 140 forms, for each filter in the first filter set and for at least one row of image elements in said image, a filtered image element of a partly scaled image by filtering a set of at least one image element in the at least one row using the filter. The filter manager 140 repeats the image element formation k times over the at least one row to form a scaled row of image elements of said partly scaled image. This forming and repeating operation is then preferably continued over the remaining rows or a selected portion thereof. Thereafter, the filter manager 140 forms, for each filter in the second filter set and for at least one column of image elements in the partly scaled image, a filtered image element of the scaled image by filtering a set of at least one image element in the at least one column using the filter. The filter manager 140 repeats the image element formation l times over the at least one column to form a scaled column of image elements of the scaled image. The column filtering is then preferably continued with further columns in the partly scaled image.

Alternatively, the filter manager 140 is arranged for first forming, for each filter in the second filter set and for at least one column of image elements in the image, a filtered image element of a partly scaled image by filtering a set of at least one image element in the at least one column using the filter. This image element formation is then repeated l times over the at least one column to form a scaled column of image elements of the partly scaled image. The filter manager 140 then forms for each filter in the first filter set and for at least one row of image elements in said partly scaled image, a filtered image element of the scaled image by filtering a set of at least one image element in said at least one row using the filter. This image element formation is repeated by the filter manager 140 k times over said at least one row to form a scaled row of image elements of the scaled image.

The resulting scaled image can then be stored in the image memory 120 by the image provider 110, transmitted to another unit by the image provider 110 or further processed, such as transcoded, compressed, by adapted equipment. In addition, or alternatively, the scaled image is forwarded, by the image provider, for display on a screen of an image rendering device connected to the image scaler 100 or in which the image scaler 100 is implemented.

The units 110, 130 and 140 of the image scaler 100 may be provided as software, hardware or a combination thereof.

FIG. 13 is a schematic block diagram of an embodiment of the filter set provider 130 of FIG. 12 in more detail. The filter set provider 130 comprises a coefficient calculator 132 arranged for calculating, for each filter in the filter set, filter coefficients. This means that since the image scaler of the invention merely needs to determine $\alpha$ instead of $N_T$ filters as the prior art scalers ($\alpha < N_T$ and most often $\alpha << N_T$), the number of filter coefficients that have to be calculated by the calculator 132 is much reduced as compared to the prior art. If each filter comprises the same number of taps, T, $\alpha \times T$ coefficients are determined by the calculator 132.

In a first embodiment, the filter manager then uses these calculated filter coefficients when filtering a first row or column of image elements. When proceeding to a second row or column, the coefficient calculator 132 can anew calculate the filter coefficients for the second and following rows or columns.

In a more preferred implementation, the coefficient calculator 132 forwards its calculated filter coefficients to a memory manager 134 of the filter set provider 130 (or a memory provider of the image scaler). In such a case, the memory manager 134 can, at least temporarily during the image scaling, store the calculated filter coefficients in a connected filter memory 136. Once the filter manager is about to filter a new row or column of image elements, the memory manager 134 can retrieve the filter coefficients from the memory 136. This means that complex and power demanding filter calculations have been replaced by simple memory reads. In this context, the filter coefficients are preferably stored on a fast on-chip memory 136 in order to reduce the time required for fetching the coefficients during the image filtering. In this embodiment, the coefficient calculator 132 needs at most calculate $\alpha$ different filters for the rows and $\beta$ filter for the columns, i.e. only $\alpha + \beta$ filters as compared to $N_T \times (M_O + M_T)$ different filters according to the prior art.

In a further embodiment, the coefficient calculator 132 is arranged for calculating filters for multiple different filter sets, which collectively form a filter bank when stored on the filter memory 136 by the memory manager 134. In such a case, each filter set is assigned for a given scale factor and is therefore selected, during the scaling operating, based on the quotient between the original and target resolutions. In such a case, actually no filter coefficient calculation at all has to be performed in connecting with the image scaling. Instead precalculated filters of the filter bank 136 can be fetched by the memory manager 134 and forwarded to the filter manager during the actual image scaling. For more information of how to select and compile such a filter bank, reference is made to the discussion presented in the foregoing.

The units 132, 134 and 136 of the filter set provider 130 may be provided as software, hardware or a combination thereof. The units 132 to 136 can all be arranged in the set provider 130. A distributed implementation with one or more of the units 132 to 136 arranged in the image scaler is also possible and within the scope of the present invention.

If the highest common denominator of the original row/column resolution and the target row/column resolution is equal to one or the highest common denominator (which also represents the number of times each filter of the filter set are employed for form a complete row or column) is rather low, the target and/or original resolution can be adjusted.

FIG. 14 is a schematic block diagram of an example embodiment of an image scaler 100 that allows for resolution adjustment. This image scaler 100 comprises the image provider 110, image memory 120, filter set provider 130 and filter manager 140. The operation of these units 110 to 140 is similar to what has been described in connection with FIG. 12 unless otherwise specified.

In addition, the image scaler 100 comprises a resolution selector 150 that is arranged for selecting a candidate original or target resolution that allows for a highest common denominator between the candidate original resolution and the target resolution or between the original resolution and the candidate target resolution that is larger than one and preferably much larger than one. The image scaler 100 also comprises an image cropper 160 and/or a border manager 170 that becomes activated depending on what resolution(s) the resolution selector 150 selects.

In a first implementation, the resolution selector 150 selects a candidate original row/column resolution $N_O^c$ that is smaller than the original row/column resolution $N_O$. In addition, the selector 150 chooses the target original resolution in such a manner that a common denominator k of the candidate original row/column resolution $N_O^c$ and the target row/column resolution $N_T$ is a positive number larger than one. In this implementation, the filter manager 140 operates on only $N_O^c$ sets of at least one image elements in the at least one row/column of the image. The filter set provider 130 uses this information of the selected candidate original resolution and the target resolution to provide (calculate or retrieve) the correct filter set to use by the filter manager 140. This further means that the image element filtering of the current row/column is only performed on $N_O^c$ image element sets and not $N_O$ image element sets, where $N_O^c<N_O$. This results in that the scaled image will constitute a scale version of only a part of the original image.

In a second implementation, the resolution selector 150 is arranged for selecting a candidate target row/column resolution $N_T^c$ that is larger than the target row/column resolution $N_T$. In addition, the target row/column resolution is selected so that a common denominator k of the original row/column resolution $N_O$ and the candidate target row/column resolution $N_T^c$ is a positive number larger than one. The filter set provider 130 uses information of the original resolution(s) and the selected candidate target resolution(s) for providing the correct filters to be used by the filter manager 140. Once the filter manager 140 has filtered and scaled the image using filters from the filter set provider 130, the scaled image is cropped by an image cropper 160. The scaled image has, due to setting the candidate target resolution larger than the target, a too large row and/or column resolution/size in terms of number of image elements. The image cropper 160 therefore crops the scaled image by deleting $N_T^c-N_T$ image elements in scaled rows/columns that are too large. This image cropping is preferably performed by deleting some of the first and last columns (if deleting image elements from rows) and deleting some of the first and last rows (if deleting image elements from columns). In other words, the cropping action of the image cropper 160 preferably preserves the central portion of the scaled image and only deletes peripheral image elements.

In a third implementation, the resolution selector 150 is arranged for selecting, if a highest common denominator of said original resolution $N_O$ and said target resolution $N_T$ is equal to one, a candidate target row/column resolution $N_T^c$ that is smaller than the target row/column resolution $N_T$. In addition, the common denominator k of the original row/column resolution $N_O$ and the selected candidate target row/column resolution $N_T^c$ should be a positive number larger than one. Information of the original resolution and the selected candidate resolution is used by the filter set provider 130 for providing correct filter(s) to the filter manager 140. In this embodiment, once the filter manager 140 processes the input image to form a scaled image, this scaled image will have a size in at least one dimension (row or column) that is smaller than the intended target size. A border manager 170 of the image scaler 100 is therefore arranged for adding $N_T-N_T^c$ image elements to the one-dimensional image element arrays (rows or columns) having a too small size. These added image elements typically have a defined color, preferably the same color for all added image elements, such black or white. The border manager 170 preferably adds image elements, if possible, to both sides of the too short image element arrays. This means that about half the width of the added border is found on one side (left or up) and the about remaining half is found on the other side (right or down). In this manner the scaled image will be framed, or at least partly framed, by the border added by the border manager 170.

In a fourth implementation, the resolution selector 150 selects a candidate original row/column resolution $N_O^c$ that is larger than the original row/column resolution $N_O$. Furthermore, this candidate resolution selection is performed so that a common denominator k of the candidate original row/column resolution $N_O^c$ and the target row/column resolution $N_T$ is a positive number larger than one. In this case, the original image will be too small in at least one dimension for the selected candidate size/resolution. Therefore, the border manager 170 will for add $N_O^c-N_O$ image elements to these too short one-dimensional image element arrays in the unscaled image. The discussion regarding how to place such image elements (preferably peripherally) and what colors the image elements should have presented above applies mutatis mutandis to this implementation.

The filter set provider 130 is also informed of this selected larger candidate original resolution together with the target resolution for the purpose of providing correct filter set to use by the filter manager 140. The filter manager 140 then filters the image with the border(s) added by the border manager 170 to form the scaled image having a correct target size.

It is anticipated that this embodiment of the image scaler 100 can be configured for only operating according to one of the mentioned implementation and therefore only requires those units that are involved in that particular implementation. However, since different implementations can be useful for different input images and different image types, the image scaler 100 can preferably be operated according to at least two of the implementations, preferably at least one cropping implementation and at least one border adding implementation.

The units 110 to 170 of the image scaler 100 may be implemented as software or hardware.

FIG. 15 illustrates a user terminal or image processing device 200 represented by a mobile unit. However, the technology in this application is not limited to mobile units but could be implemented in other terminals and image processing devices, such as PC computers, game consoles, PDAs and dedicated image rendering equipment. Only means and elements in the mobile unit 200 directly involved are illustrated in the figure.

The mobile unit 200 comprises a graphic system 230 for managing image and graphic data. In particular, the graphic system 230 is adapted for rendering or displaying images on a connected screen 220 or other display unit. The mobile unit 100 also comprises a storage or memory 240 for storing data therein. In this memory 240 image data and/or filter data may be stored.

An image scaler 100 is provided in the mobile unit 200, preferably implemented as a component of the graphic system 230. This image scaler 100 can be the scaler disclosed in FIG. 12 or 14. The scaler 100 is used for scaling input images generated by the graphic system 230, provided from the storage 240 and/or received by an I/O unit 210 so that the image size/resolution matches the resolution of the display screen 220.

The units 100, 210, 230 and 240 of the mobile unit 100 may be provided as software, hardware or a combination thereof.

In a more general aspect, the teachings can be employed for efficient filtering or resampling of a general data signal. This data signal can be an audio data signal; an image data signal, such as such a data signal representing color values of a row or column of image elements of an image; multimedia data; seismological signal; radar signal; volumetric 3D data signal; etc. Actually, the data signal can be any data signal having an original sampling rate $N_O$ and which should be resampled or filtered to form a resampled data signal having a target sampling rate $N_T$. This means that the image filtering/scaling described in the foregoing can be seen as an illustrative and representative embodiment of such data signal filtering.

In similarity to the foregoing, the data signal resampling method involves providing a filter set comprising $\alpha$ filters. This number $\alpha$ is equal to a quotient of the target sampling rate $N_T$ and a common denominator k of the original sampling rate $N_O$ and the target sampling rate $N_T$. In addition, the common denominator k is a positive number larger than one. Thereafter, a filtered sample of the resampled data signal is formed for each filter in the filter set and by filtering a set of at least one sample in the data signal using the filter. The sample formation and sample set filtering is repeated up to k times, preferably k times, over the data signal to form the resampled data signal.

This data signal resampling method allows for an efficient usage of the filters by only requiring a limited and small number of different filters and then cyclic reuse of these filters for the remainder signal resampling. This means that the advantages discussed above for the image scaling embodiments applies mutatis mutandis to this general aspect.

This general aspect also encompasses a signal resampler adapted for resampling a data signal having an original sampling rate $N_O$ into a resampled data signal having a target sampling rate $N_T$. This signal resampler comprises a filter set provider arranged for providing a filter set comprising a filters. As described above, the number $\alpha$ is equal to a quotient of the target sampling rate $N_T$ and a common denominator k of the original sampling rate $N_O$ and the target sampling rate $N$. In addition, the common denominator k is a positive number larger than one. The resampler also comprises a filter manager arranged for forming, for each filter in the filter set, a filtered sample of the resampled data signal by filtering a set of at least one sample in said data signal using the filter. The filter manager also repeats the sample formation up to k times over the data signal to form the resampled data signal.

It will be understood by a person skilled in the art that various modifications and changes may be made without departure from the scope of the technology in this application. However, the invention is solely defined by the appended claims.

REFERENCES

[1] Mitchell, D. and Netravali, A., "Reconstruction Filters in Computer Graphics", *ACM Transaction on Graphics, Proceedings of ACM SIGGRAPH*1988, 22(4):221-228, 1988

The invention claimed is:

1. A method of scaling an image having an original row/column resolution $N_O$ into a scaled image having a target row/column resolution $N_T$, said method comprising the steps of:
    if a highest common denominator of said original row/column resolution $N_O$ and said target row/column resolution $N_T$ is equal to one, selecting a candidate original row/column resolution $N_O^c$ and a candidate target row/column resolution $N_T^c$ so that a common denominator k of said candidate original row/column resolution $N_O^c$ and said candidate target row/column resolution $N_T$_hu cis larger than a highest common denominator of said original row/column resolution $N_O$ and said target row/column resolution $N_T$,
    providing a filter set comprising $\alpha$ filters, $\alpha$ being equal to a quotient of said candidate target row/column resolution $N_T^c$ and said common denominator k k;
for at least one row/column of image elements in said image:
    forming, for each filter in said filter set, a filtered image element of said scaled image by filtering a set of at least one image element in said at least one row/column using said filter; and
    repeating said forming step up to k times over said at least one row/column to form a scaled row/column of image elements of said scaled image.

2. The method according to claim 1, wherein said repeating step comprises repeating said forming step k times over said at least one row/column to form said scaled row/column of image elements of said scaled image.

3. The method according to claim 1, wherein said providing step comprises the steps of:
    calculating filter coefficients of said $\alpha$ filters of said filter set for a first row/column of said image element;
    storing said calculated filter coefficients in a memory; and
    reading, for each remaining row/column in said image, said calculated filter coefficients from said memory.

4. The method according to claim 1, wherein said image has an original row resolution of $N_O$ and an original column resolution of $M_O$ and said scaled image has a corresponding target row resolution of $N_T$ and a corresponding target column resolution of $M_T$, said providing step comprises the steps of:
    selecting a candidate original row resolution $N_O^c$ and a candidate target row resolution $N_T^c$ so that a common denominator k of said candidate original row resolution $N_O^c$ and said candidate target row resolution $N_T^c$ is larger than a highest common denominator of said original row resolution $N_O$ and said target row resolution $N_T$,
    selecting a candidate original column resolution $M_O^c$ and a candidate target column resolution $M_T^c$ so a common denominator l of said candidate original column resolution $M_O^c$ and said candidate target column resolution $M_T^c$ is larger than a highest denominator of said original column resolution $M_O$ and said target column resolution $M_T$,
    providing a first filter set comprising $\alpha$ filters, $\alpha$ being equal to a quotient of said target row resolution $N_T$ and a common denominator k of said original row resolution $N_O$ and said target row resolution $N_T$, which common denominator k is a positive number larger than one; and providing a second filter set comprising β filters, β being equal to a quotient of said target column resolution $M_T$ and a common denominator l of said original column resolution $M_O$ and said target column resolution $M_T$, which common denominator l is a positive number larger than one.

5. The method according to claim 4, wherein said forming and repeating steps comprise the steps of:

for at least one row of image elements in said image:

forming, for each filter in said first filter set, a filtered image element of a partly scaled image by filtering a set of at least one image element in said at least one row using said filter; and repeating said forming step k times over said at least one row to form a scaled row of image elements of said partly scaled image, for at least one column of image elements in said partly scaled image:

forming, for each filter in said second filter set, a filtered image element of said scaled image by filtering a set of at least one image element in said at least one column using said filter; and repeating said forming step l times over said at least one column to form a scaled column of image elements of said scaled image.

6. The method according to claim 4, wherein said forming and repeating steps comprise the steps of:

for at least one column of image elements in said image:

forming, for each filter in said second filter set, a filtered image element of a partly scaled image by filtering a set of at least one image element in said at least one column using said filter;

repeating said forming step l times over said at least one column to form a scaled column of image elements of said partly scaled image, for at least one row of image elements in said partly scaled image:

forming, for each filter in said first filter set, a filtered image element of said scaled image by filtering a set of at least one image element in said at least one row using said filter; and repeating said forming step k times over said at least one row to form a scaled row of image elements of said scaled image.

7. The method according to claim 1, further comprising the steps of:

defining multiple filter sets collectively forming a filter bank, where each filter set corresponds to a defined scale factor;

calculating, for each filter set of said multiple filter sets, filter coefficients for filters in said filter set; and storing said filter coefficients in a memory, wherein said providing step comprises retrieving, from said memory, filter coefficients of filters of a filter set having a defined scale factor corresponding to a target scale factor equal to a quotient of said candidate target row/column resolution $N_T^c$ and said candidate original row/column resolution $N_O^c$.

8. The method according to claim 1, wherein said common denominator k of said candidate original row/column resolution $N_O^c$ and said candidate target row/column resolution $N_T^c$ is the greatest common denominator between said candidate original row/column resolution $N_O^c$ and said candidate target row/column resolution $N_T^c$.

9. The method according to claim 1, wherein said candidate original row/column resolution $N_O^c$ is smaller than said original row/column resolution $N_O$.

10. The method according to claim 1, wherein said candidate original row/column resolution $N_O^c$ is larger than said original row/column resolution $N_O$.

11. The method according to claim 1, wherein said candidate target row/column resolution $N_T^c$ is larger than said target row/column resolution $N_T$.

12. The method according to claim 1, wherein said candidate target row/column resolution $N_T^c$ is smaller than said target row/column resolution $N_T$.

13. An image scaler adapted for scaling an image having an original row/column resolution $N_O$ into a scaled image having a target row/column resolution $N_T$, said scaler comprising:

resolution selection circuitry arranged for selecting, if a highest common denominator of said original row/column resolution $N_O$ and said target row/column resolution $N_T$ is equal to one, a candidate original row/column resolution $N_O^c$ and a candidate target row/column resolution $N_T^c$ so that a common denominator k of said candidate original row/column resolution $N_O^c$ and said candidate target row/column resolution $N_T^c$ is larger than a highest common denominator of said original row/column resolution $N_O$ and said target row/column resolution $N_T$, filter set circuitry arranged for providing a filter set comprising α filters, α being equal to a quotient of said target row/column resolution $N_T$ and a common denominator k of said original row/column resolution $N_O$ and said target row/column resolution $N_T$, said common denominator k is a positive number larger than one;

filter management circuitry arranged for i) forming, for each filter in said filter set and for at least one row/column of image elements in said image, a filtered image element of said scaled image by filter a set of at least one image element in said at least one row/column using said filter and ii) repeating the image element formation up to k times over said at least one row/column to form a scaled row/column of image elements of said scaled image.

14. The image scaler according to claim 13, wherein said filter management is arranged for repeating said forming k times over said at least one row/column to form said scaled row/column of image elements of said scaled image.

15. The image scaler according to claim 13, wherein said filter set circuitry comprises:

a coefficient calculator arranged for calculating filter coefficients of said α filters of said filter set for a first row/column of said image element; and a memory manager arranged for i) storing said calculated filter coefficients in a connected memory, and ii) for retrieving, for each remaining row/column in said image, said calculated filter coefficients from said memory.

16. The image scaler according to claim 13, wherein said image has an original row resolution of $N_O$ and an original column resolution of $M_O$ and said scaled image has a corresponding target row resolution of $N_T$ and a corresponding target column resolution of $M_T$, said resolution selection circuitry is arranged for i) selecting a candidate original row resolution $N_O^c$ and a candidate target row resolution $N_T^c$ so that a common denominator k of said candidate original row resolution $N_O^c$ and said candidate target row resolution $N_T^c$ is larger than a highest common denominator of said original row resolution $N_O$ and said target row/column resolution $N_T$, and ii) selecting a candidate original column resolution $M_O^c$ and a candidate target column resolution $M_T^c$, so a common denominator l of said candidate original column resolution $M_O^c$ and said candidate target column resolution $M_T^c$ is larger than the greatest common denominator $l^{old}$ of said original column resolution $M_O$ and said target row/column resolution $M_T$, and wherein said filter set circuitry is arranged for i) providing a first filter set comprising α filters, α being equal to a quotient of said target row resolution $N_T$ and a common denominator k of said original row resolution $N_O$ and said target row resolution $N_T$, which common denominator k is a positive number larger than one, and ii) providing a second filter set comprising β filters, β being equal to a quotient of said target column resolution $M_T$ and a common denominator l of said original column resolution $M_O$ and said target column resolution $M_T$, which common denominator l is a positive number larger than one.

17. The image scaler according to claim 16, wherein said filter management circuitry is arranged for i) forming, for each filter in said first filter set and for at least one row of image elements in said image, a filtered image element of a partly scaled image by filtering a set of at least one image element in said at least one row using said filter, ii) repeating the image element formation k times over said at least one row to form a scaled row of image elements of said partly scaled image, iii) forming, for each filter in said second filter set and for at least one column of image elements in said partly scaled image, a filtered image element of said scaled image by filtering a set of at least one image element in said at least one column using said filter, and iv) repeating the image element formation l times over said at least one column to form a scaled column of image elements of said scaled image.

18. The image scaler according to claim 17, wherein said filter management circuitry is arranged for i) forming, for each filter in said second filter set and for at least one column of image elements in said image, a filtered image element of a partly scaled image by filtering a set of at least one image element in said at least one column using said filter, ii) repeating the image element formation l times over said at least one column to form a scaled column of image elements of said partly scaled image, iii) forming, for each filter in said first filter set and for at least one row of image elements in said partly scaled image, a filtered image element of said scaled image by filtering a set of at least one image element in said at least one row using said filter, and iv) repeating the image element formation k times over said at least one row to form a scaled row of image elements of said scaled image.

19. The image scaler according to claim 13, further comprising:
a coefficient calculator arranged for calculating, for each filter set of a filter bank comprising multiple filter sets, filter coefficients for filters in said filter set, each filter set corresponding to a defined scale factor; and
a memory arranged for storing said filter coefficients, wherein said filter set provider comprises a memory manager arranged for retrieving, from said memory, filter coefficients of filters of a filter set having a defined scale factor corresponding to a target scale factor equal to a quotient of said target row/column resolution $N_T$ and said original row/column resolution $N_O$.

20. An image processing device comprising:
an image provider for providing an image having an original row/column resolution $N_O$;
an image scaler according to claim 13 for scaling said image into a scaled image having a target row/column resolution $N_T$; and
a graphical processor for displaying said scaled image on a connected display screen.

21. The image scaler according to claim 13, wherein said common denominator k of said candidate original row/column resolution $N_O^c$ and said candidate target row/column resolution $N_T^c$ is the greatest common denominator between said candidate original row/column resolution $N_O^c$ and said candidate target row/column resolution $N_T^c$.

22. The image scaler according to claim 13, wherein said candidate original row/column resolution $N_O^c$ is smaller than said original row/column resolution $N_O$.

23. The image scaler according to claim 13, wherein said candidate original row/column resolution $N_O^c$ is larger than said original row/column resolution $N_O$.

24. The image scaler according to claim 13, wherein said candidate target row/column resolution $N_T^c$ is larger than said target row/column resolution $N_T$.

25. The image scaler according to claim 13, wherein said candidate target row/column resolution $N_T^c$ is smaller than said target row/column resolution $N_T$.

26. A method of scaling an image having an original resolution $N_0$ in a first dimension into a scaled image having a target resolution $N_T$ in said first dimension, said method comprising the steps of:
if a highest common denominator of said original row/column resolution $N_O$ and said target row/column resolution $N_T$ is equal to one, selecting a candidate original row/column resolution $N_O^c$ and a candidate target row/column resolution $N_T^c$ so that a common denominator k of said candidate original row/column resolution $N_O^c$ and said candidate target row/column resolution $N_T^c$ is larger than a highest common denominator of said original row/column resolution $N_O$ and said target row/column resolution $N_T$;
providing a filter set comprising α filters, α being equal to a quotient of said target resolution $N_T$ and a common denominator k of said original resolution $N_O$ and said target resolution $N_T$, said common denominator k is a positive number larger than one;
for at least one one-dimensional array of image elements in said image:
forming, for each filter in said filter set, a filtered image element of said scaled image by filtering a set of at least one image element in said at least one one-dimensional array using said filter; and
repeating said forming step up to k times over said at least one one-dimensional array to form a scaled one-dimensional array of image elements of said scaled image.

27. An image scaler adapted for scaling an image having an original resolution $N_O$ in a first dimension into a scaled image having a target resolution $N_T$ in said first dimension, said scaler comprising:
resolution selection circuitry arranged for selecting, if a highest common denominator of said original row/column resolution $N_O$ and said target row/column resolution $N_T$ is equal to one, a candidate original row/column resolution $N_O^c$ and a candidate target row/column resolution $N_T^c$ so that a common denominator k of said candidate original row/column resolution $N_O^c$ and said candidate target row/column resolution $N_T^c$ is larger than a highest common denominator of said original row/column resolution $N_O$ and said target row/column resolution $N_T$;
filter set circuitry arranged for providing a filter set comprising α filters, α being equal to a quotient of said target resolution $N_T$ and a common denominator k of said original resolution $N_O$ and said target resolution $N_T$, said common denominator k is a positive number larger than one;

filter management circuitry arranged for i) forming, for each filter in said filter set and for at least one one-dimensional array of image elements in said image, a filtered image element of said scaled image by filtering a set of at least one image element in said at least one one-dimensional array using said filter and ii) repeating the image element formation up to k times over said at least one one-dimensional array to form a scaled one-dimensional array of image elements of said scaled image.

* * * * *

UNITED STATES PATENT AND TRADEMARK OFFICE
CERTIFICATE OF CORRECTION

PATENT NO. : 7,848,597 B2
APPLICATION NO. : 11/517563
DATED : December 7, 2010
INVENTOR(S) : Strom et al.

It is certified that error appears in the above-identified patent and that said Letters Patent is hereby corrected as shown below:

In Fig. 10, Sheet 7 of 10, for Tag "S63", in Line 1, delete "BOARDER" and insert -- BORDER --, therefor.

In Column 3, Line 9, delete "78 750" and insert -- 78750 --, therefor.

In Column 3, Line 21, delete "$_M$." and insert -- $M_T$. --, therefor.

In Column 3, Line 41, delete "number a" and insert -- number $\alpha$ --, therefor.

In Column 5, Line 3, delete "M $_T \times N_T$." and insert -- $M_T \times N_T$. --, therefor.

In Column 5, Line 7, delete "image Thus," and insert -- image. Thus, --, therefor.

In Column 5, Line 61, delete "$N_O$can" and insert -- $N_O$ can --, therefor.

In Column 6, Line 5, delete "image In" and insert -- image. In --, therefor.

In Column 7, Line 29, delete "393 750" and insert -- 393750 --, therefor.

In Column 8, Line 37, delete "N." and insert -- $N_T$. --, therefor.

In Column 9, Line 4, delete "element" and insert -- element. --, therefor.

In Column 12, Line 25, delete "SI 1" and insert -- S11 --, therefor.

In Column 14, Line 56, delete "2 880" and insert -- 2880 --, therefor.

In Column 15, Line 51, delete "3tap" and insert -- 3 tap --, therefor.

Signed and Sealed this
Twenty-fourth Day of May, 2011

David J. Kappos
*Director of the United States Patent and Trademark Office*

CERTIFICATE OF CORRECTION (continued)
U.S. Pat. No. 7,848,597 B2

In Column 15, Line 61, delete "thereof The" and insert -- thereof. The --, therefor.

In Column 18, Line 10, delete "$N_T$-$N_T^c$image" and insert -- $N_T^c$-$N_T$ image --, therefor.

In Column 19, Lines 2-3, delete "$N_T$-$N_T^c$image" and insert -- $N_T$-$N_T^c$ image --, therefor.

In Column 20, Line 36, delete "10" and insert -- 110 --, therefor.

In Column 25, Line 10, delete "I/0" and insert -- I/O --, therefor.

In Column 25, Line 58, delete "$_N$." and insert -- $N_T$. --, therefor.

In Column 26, Line 9, delete "SIGGRAPH1988," and insert -- SIGGRAPH 1988, --, therefor.

In Column 26, Line 19, in Claim 1, delete "$N_T^c$so" and insert -- $N_T^c$ so --, therefor.

In Column 26, Lines 21-22, in Claim 1, delete "$N_T$ hu cis" and insert -- $N_T^c$ is --, therefor.

In Column 26, Line 27, in Claim 1, delete "$N_{T\text{-}}{}^c$" and insert -- $N_T^c$ --, therefor.

In Column 26, Line 27, in Claim 1, delete "k k;" and insert -- k; --, therefor.

In Column 27, Line 65, in Claim 8, delete "$N_T^c$is" and insert -- $N_T^c$ is --, therefor.

In Column 28, Line 22, in Claim 13, delete "$N_T^c$so" and insert -- $N_T^c$ so --, therefor.

In Column 28, Line 44, in Claim 14, after "management" insert -- circuitry --.

In Column 29, Line 14, in Claim 16, delete "$M_T$and" and insert -- $M_T$ and --, therefor.

In Column 30, Line 6, in Claim 21, delete "$N_T^c$is" and insert -- $N_T^c$ is --, therefor.

In Column 30, Line 22, in Claim 26, delete "$N_0$" and insert -- $N_O$ --, therefor.

In Column 30, Line 59, in Claim 27, delete "$N_T$" and insert -- $N_T^C$ --, therefor.